US 8,817,325 B2

(12) United States Patent
Oteki

(10) Patent No.: US 8,817,325 B2
(45) Date of Patent: Aug. 26, 2014

(54) CONTROL DEVICE, IMAGE SCANNING APPARATUS, IMAGE FORMING APPARATUS, AND METHOD OF CONTROLLING IMAGE SCANNING APPARATUS

(75) Inventor: Sugitaka Oteki, Tokyo (JP)

(73) Assignee: Ricoh Company, Limited, Tokyo (JP)

(*) Notice: Subject to any disclaimer, the term of this patent is extended or adjusted under 35 U.S.C. 154(b) by 330 days.

(21) Appl. No.: 12/858,843

(22) Filed: Aug. 18, 2010

(65) Prior Publication Data

US 2011/0051157 A1 Mar. 3, 2011

(30) Foreign Application Priority Data

Sep. 1, 2009 (JP) ................................ 2009-201746

(51) Int. Cl.
*H04N 1/393* (2006.01)
*G06T 3/40* (2006.01)

(52) U.S. Cl.
USPC ........ 358/1.9; 358/1.16; 382/235; 348/222.1; 345/589; 345/590

(58) Field of Classification Search
CPC ........................................................ G06T 3/40
See application file for complete search history.

(56) References Cited

U.S. PATENT DOCUMENTS

| 4,271,476 | A  | * | 6/1981 | Lotspiech | 382/235 |
| 4,602,778 | A  | * | 7/1986 | Hirose et al. | 271/227 |
| 4,734,786 | A  | * | 3/1988 | Minakawa et al. | 358/451 |
| 5,309,253 | A  | * | 5/1994 | Ariga et al. | 358/451 |
| 5,787,239 | A  | * | 7/1998 | Horie et al. | 358/1.15 |
| 6,222,949 | B1 | * | 4/2001 | Nakata | 382/298 |
| 7,209,260 | B1 | * | 4/2007 | Tanaka et al. | 358/1.2 |
| 7,518,625 | B2 | * | 4/2009 | Ikeda | 347/234 |
| 2006/0061601 | A1 | * | 3/2006 | Iga et al. | 345/660 |
| 2008/0025622 | A1 | * | 1/2008 | Hanamoto et al. | 382/235 |
| 2008/0174822 | A1 | * | 7/2008 | Kaimi et al. | 358/1.16 |

FOREIGN PATENT DOCUMENTS

| JP | 2002-199170 | 7/2002 |
| JP | 2005-210268 | 8/2005 |
| JP | 2005-268893 | 9/2005 |

* cited by examiner

*Primary Examiner* — Marivelisse Santiago Cordero
*Assistant Examiner* — Daryl Jackson
(74) *Attorney, Agent, or Firm* — Oblon, Spivak, McClelland, Maier & Neustadt, L.L.P.

(57) ABSTRACT

A control device including an image enlarging unit that creates enlarged image data of image data by repeatedly using a line in the image data; and a control unit that reads, from a storing unit in which the image data is stored, the image data and outputs, to the image enlarging unit, the image data for each line, the output being performed at time intervals corresponding to the number of times the line is used in accordance with an enlargement ratio of the image data to the enlarged image data.

13 Claims, 21 Drawing Sheets

| No. | SFM [1:0] | VARIABLE ENLARGEMENT MODE |
|---|---|---|
| 1 | 0 0 | SAME-SIZE OR REDUCTION |
| 2 | 0 1 | |
| 3 | 1 0 | ENLARGEMENT RATIO: 101 TO 200% |
| 4 | 1 1 | ENLARGEMENT RATIO: 201 TO 400% |

FIG. 15A

| VARIABLE ENLARGEMENT CONTROL DATA NO. | VARIABLE ENLARGEMENT CONTROL DATA | | | |
|---|---|---|---|---|
| | HEXADECIMAL DISPLAY | | BINARY DISPLAY | |
| | a | b | a | b [2] [1] [0] |
| 1 | 1 | 0 | 1 | 0 0 0 |

FIG. 15B

| VARIABLE ENLARGEMENT CONTROL DATA NO. | VARIABLE ENLARGEMENT CONTROL DATA | | | |
|---|---|---|---|---|
| | HEXADECIMAL DISPLAY | | BINARY DISPLAY | |
| | a | b | a | b [2] [1] [0] |
| 1 | 0 | 0 | 0 | 0 0 0 |
| 2 | 1 | 4 | 1 | 1 0 0 |

FIG. 15C

| VARIABLE ENLARGEMENT CONTROL DATA NO. | VARIABLE ENLARGEMENT CONTROL DATA | | | |
|---|---|---|---|---|
| | HEXADECIMAL DISPLAY | | BINARY DISPLAY | |
| | a | b | a | b [2] [1] [0] |
| 1 | 0 | 0 | 0 | 0 0 0 |
| 2 | 0 | 2 | 0 | 0 1 0 |
| 3 | 1 | 5 | 1 | 1 0 1 |

FIG. 15D

| VARIABLE ENLARGEMENT CONTROL DATA NO. | VARIABLE ENLARGEMENT CONTROL DATA | | | |
|---|---|---|---|---|
| | HEXADECIMAL DISPLAY | | BINARY DISPLAY | |
| | a | b | a | b [2] [1] [0] |
| 1 | 0 | 0 | 0 | 0 0 0 |
| 2 | 0 | 2 | 0 | 0 1 0 |
| 3 | 0 | 4 | 0 | 1 0 0 |
| 4 | 1 | 6 | 1 | 1 1 0 |

| VARIABLE ENLARGEMENT CONTROL DATA NO. | VARIABLE ENLARGEMENT CONTROL DATA | | | |
|---|---|---|---|---|
| | HEXADECIMAL DISPLAY | | BINARY DISPLAY | |
| | a | b | a | b [2] [1] [0] |
| 1 | 0 | 0 | 0 | 0 0 0 |
| 2 | 1 | 5 | 1 | 1 0 1 |
| 3 | 1 | 3 | 1 | 0 1 1 |
| 4 | 0 | 1 | 0 | 0 0 1 |
| 5 | 1 | 6 | 1 | 1 1 0 |
| 6 | 1 | 4 | 1 | 1 0 0 |
| 7 | 0 | 2 | 0 | 0 1 0 |
| 8 | 1 | 7 | 1 | 1 1 1 |
| 9 | 1 | 5 | 1 | 1 0 1 |
| 10 | 1 | 3 | 1 | 0 1 1 |
| 11 | 0 | 0 | 0 | 0 0 0 |
| 12 | 1 | 6 | 1 | 1 1 0 |
| 13 | 1 | 4 | 1 | 1 0 0 |
| 14 | 0 | 1 | 0 | 0 0 1 |
| 15 | 1 | 7 | 1 | 1 1 1 |
| 16 | 1 | 5 | 1 | 1 0 1 |
| 17 | 1 | 2 | 1 | 0 1 0 |
| 18 | 0 | 0 | 0 | 0 0 0 |
| 19 | 1 | 6 | 1 | 1 1 0 |
| 20 | 1 | 3 | 1 | 0 1 1 |

FIG. 15EB

| | | | | | | |
|---|---|---|---|---|---|---|
| 21 | 0 | 1 | 0 | 0 | 0 | 1 |
| 22 | 1 | 7 | 1 | 1 | 1 | 1 |
| 23 | 1 | 4 | 1 | 1 | 0 | 0 |
| 24 | 1 | 2 | 1 | 0 | 1 | 0 |
| 25 | 0 | 0 | 0 | 0 | 0 | 0 |
| 26 | 1 | 5 | 1 | 1 | 0 | 1 |
| 27 | 1 | 3 | 1 | 0 | 1 | 1 |
| 28 | 0 | 1 | 0 | 0 | 0 | 1 |
| 29 | 1 | 6 | 1 | 1 | 1 | 0 |
| 30 | 1 | 4 | 1 | 1 | 0 | 0 |
| 31 | 0 | 2 | 0 | 0 | 1 | 0 |
| 32 | 1 | 7 | 1 | 1 | 1 | 1 |
| 33 | 1 | 5 | 1 | 1 | 0 | 1 |
| . | . | . | . | . | | |
| . | . | . | . | . | | |
| . | . | . | . | . | | |
| 141 | 0 | 0 | 0 | 0 | 0 | 0 |

CONTROL DEVICE, IMAGE SCANNING APPARATUS, IMAGE FORMING APPARATUS, AND METHOD OF CONTROLLING IMAGE SCANNING APPARATUS

CROSS-REFERENCE TO RELATED APPLICATIONS

The present application claims priority to and incorporates by reference the entire contents of Japanese Patent Application No. 2009-201746 filed in Japan on Sep. 1, 2009.

BACKGROUND OF THE INVENTION

1. Field of the Invention

The present invention relates to a control device, an image scanning apparatus, an image forming apparatus, and a method of controlling the image scanning apparatus.

2. Description of the Related Art

With conventional technology, after receiving image data, scanning apparatuses store the image data in a memory, read it from the memory, perform image processing thereon, and output the processed data. For example, from among image scanning apparatuses that perform double-sided scanning, if the apparatuses uses a function of scanning front surfaces and a function of scanning back surfaces, such apparatuses perform, after accumulating read image data in a memory, the image processing by reading the image data from the memory for each surface.

For example, Japanese Patent Application Laid-open No. 2005-210268 discloses an image scanning apparatus that includes a correction unit that makes the density of images of both sides substantially uniform. The image scanning apparatus disclosed in Japanese Patent Application Laid-open No. 2005-210268 is configured such that a memory is arranged that stores therein image data of a back surface and image processing of the image data on the front surface is associated with the image data of the back surface.

Furthermore, Japanese Patent Application Laid-open No. 2002-199170 discloses an image scanning apparatus that scans images of both sides and transmits data at a high speed by varying the rate of the image data scanned per unit time and the rate of scanned image data transmitted per unit time.

However, with the image scanning apparatuses described in Japanese Patent Application Laid-open No. 2005-210268 and Japanese Patent Application Laid-open No. 2002-199170, when an enlargement process is performed on scanned image data, reducing the processing time is not considered. The enlargement process is implemented by repeatedly using a line of the image data. Accordingly, by outputting, to a processing unit that performs the enlargement process, the line of the image data to be used at an appropriate time interval, the processing time may be suitably controlled.

To achieve the object described above, a control device of the present invention uses the following configuration.

Accordingly, when performing an enlargement process by reading the image data stored in a memory, it is possible to provide a control device that reduces, as much as possible, the time required for outputting enlarged image data.

To solve the above problem, the present invention may be applied to an image scanning apparatus or an image forming apparatus that includes the control device or applied to a method of controlling the image scanning apparatus that includes the control device.

SUMMARY OF THE INVENTION

It is an object of the present invention to at least partially solve the problems in the conventional technology.

According to an aspect of the present invention, a control device comprises an image enlarging unit that creates enlarged image data of image data by repeatedly using a line in the image data; and a control unit that reads, from a storing unit in which the image data is stored, the image data and outputs, to the image enlarging unit, the image data for each line, the output being performed at time intervals corresponding to the number of times the line is used in accordance with an enlargement ratio of the image data to the enlarged image data.

According to another aspect of the present invention, an image scanning apparatus comprises: a storing unit that stores image data created by optically reading an image formed on a manuscript; an image enlarging unit that creates enlarged image data of the image data by repeatedly using a line in the image data; and a control unit that reads, from the storing unit, the image data and outputs, to the image enlarging unit, the image data for each line, the output being performed at time intervals corresponding to the number of times the line is used in accordance with an enlargement ratio of the image data to the enlarged image data.

According to still another aspect of the present invention, a method of controlling an image scanning apparatus comprises: storing, in a storing unit, image data created by optically reading an image formed on a manuscript; enlarging the image of the image data by repeatedly using a line in the image data; and reading the image data from the storing unit and outputting, to the image enlarging unit, the image data for each line, the outputting being performed at time intervals corresponding to the number of times the line is used in accordance with an enlargement ratio of the image data to the enlarged image data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 15A is a schematic diagram illustrating an example of a control signal obtained when a same-size process is performed;

FIG. 15B is a schematic diagram illustrating an example of a control signal obtained when an enlargement process, in which the enlargement ratio is 200%, is performed;

FIG. 15C is a schematic diagram illustrating an example of a control signal obtained when an enlargement process, in which the enlargement ratio is 300%, is performed;

FIG. 15D is a schematic diagram illustrating an example of a control signal obtained when an enlargement process, in which the enlargement ratio is 400%, is performed;

FIG. 15E is a schematic diagram illustrating an example of a control signal obtained when an enlargement process, in which the enlargement ratio is 141%, is performed;

DETAILED DESCRIPTION OF THE PREFERRED EMBODIMENTS

Embodiment of the Present Invention

In the following, a preferred embodiment will be described with reference to the accompanying drawings.

Embodiment

Figure 1:
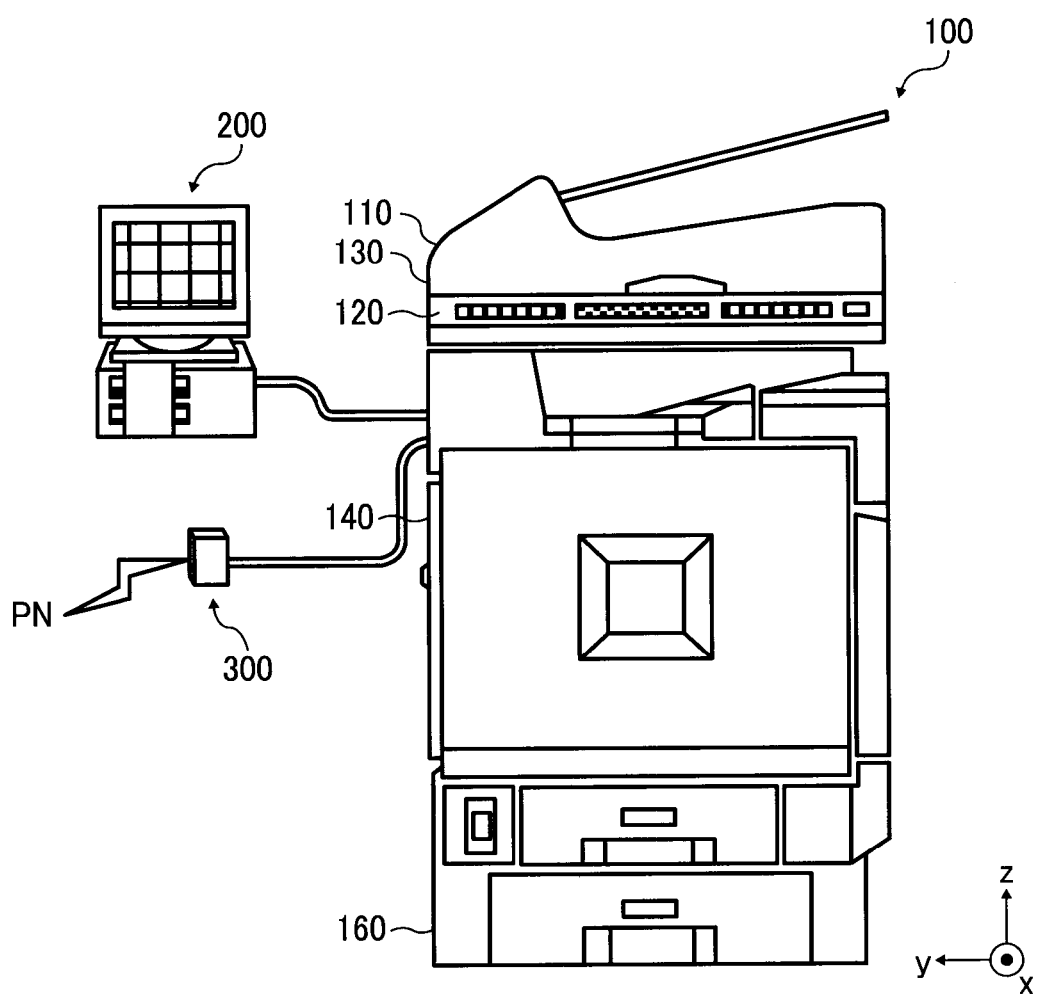
FIG. 1 is a schematic diagram illustrating an MFP (multifunction product) that includes an image scanning apparatus according to an embodiment.

FIG. 1 is a schematic diagram illustrating an MFP that includes an image scanning apparatus according to an embodiment. An MFP 100 illustrated in FIG. 1 includes an automatic document feeder (hereinafter, referred to as "ADF") 110, an operation board 120, a scanner 130, a printer 140, and a paper feeding bank 160. The ADF 110 guides manuscripts, which are placed on a sheet tray, to a conveying path and causes the scanner 130 to scan the image data from the manuscripts.

The operation board 120 displays a screen that is used to urge an operator to input instructions toward the MFP 100 and receives inputs from the operator. The scanner 130 outputs signals obtained by optically scanning an image formed on a manuscript. The printer 140 forms the image on a medium and outputs it. The paper feeding bank 160 stores therein media that are used by the MFP 100. A finisher (not shown) performs, on a medium on which an image is formed, a binding process, such as a stapling process, a sorting process, and the like.

The MFP 100 is connected to a personal computer 200 and is further connected to a facsimile line PN via a PBX 300.

Figure 2:
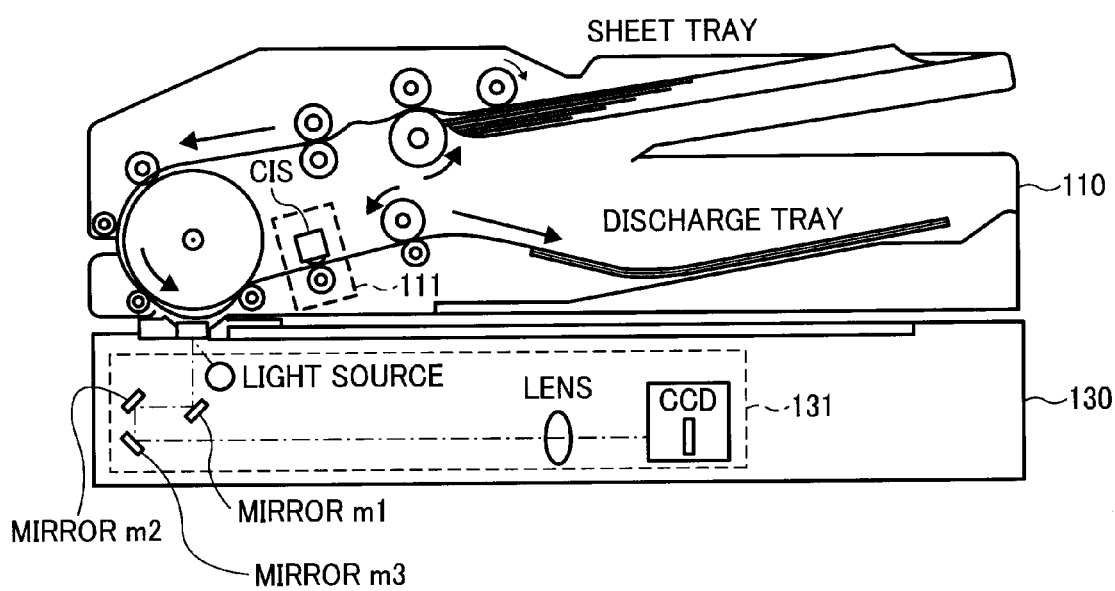
FIG. 2 is a schematic diagram illustrating an example of a double-sided scanning unit.

FIG. 2 is a schematic diagram illustrating an example of a double-sided scanning unit. The double-sided scanning unit illustrated in FIG. 2 scans both sides of a manuscript each time the manuscript passes, in a predetermined order, along a conveying path. In the example illustrated in FIG. 2, the MFP 100 has two scanning units: a contact image sensor (CIS) 111 and a scanning unit 131. The contact image sensor 111 is arranged inside the ADF 110 and scans a back surface of the manuscript. The scanning unit 131 scans a front surface of the manuscript. The scanning unit 131 scans, using a CCD, light that is reflected from a light source and is guided by a mirror m1, a mirror m2, and a mirror m3.

Figure 3:
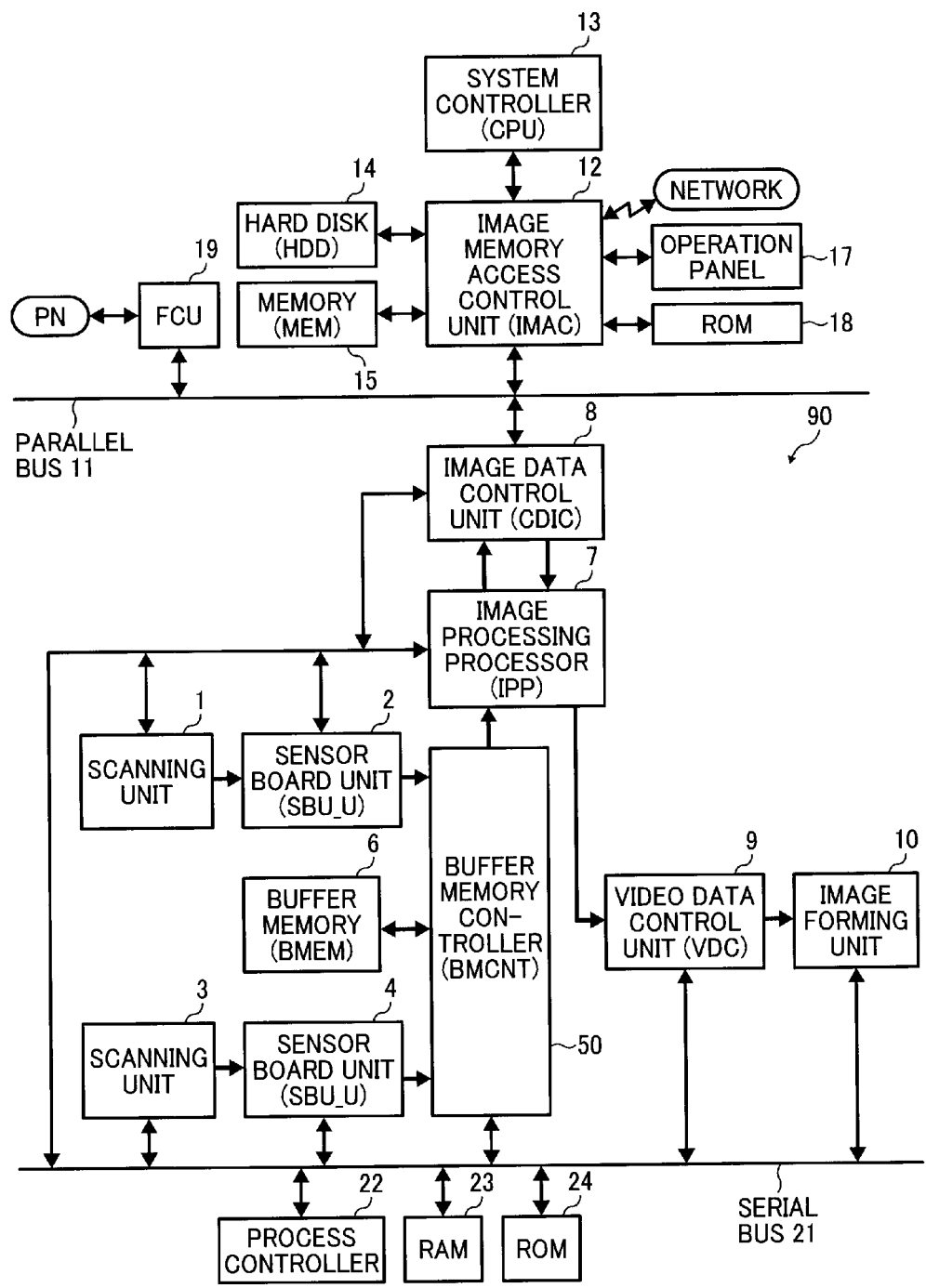
FIG. 3 is a functional block diagram illustrating a control unit included in the image scanning apparatus according to the present embodiment.

FIG. 3 is a functional block diagram illustrating a control unit included in the image scanning apparatus according to the present embodiment. A control unit 90 illustrated in FIG. 3 includes a scanning unit 1, a sensor board unit (SBU_U) 2, a scanning unit 3, a sensor board unit (SBU_U) 4, a buffer memory controller (hereinafter, referred to as "BMCNT") 50, a buffer memory 6, an image processing processor (hereinafter, referred to as "IPP") 7, an image data control unit (hereinafter, referred to as "CDIC") 8, a video data control unit (VDC) 9, an image forming unit 10, a parallel bus 11, an image memory access control unit (hereinafter, referred to as "IMAC") 12, a system controller 13, a hard disk 14, a memory 15, an operation panel 17, a ROM 18, an FC 19, a serial bus 21, a process controller 22, a RAM 23, and a ROM 24.

The scanning unit 1 scans a front surface of a manuscript, and outputs a signal to the sensor board unit 2. The sensor board unit 2 creates image data from the signal scanned by the scanning unit 1, and outputs the image data to the BMCNT 50. The scanning unit 3 scans a back surface of a manuscript and outputs a signal to the sensor board unit 4. The sensor board unit 4 creates, from a signal scanned by the scanning unit 3, image data and outputs the image data to the BMCNT 50.

The BMCNT 50 stores the image data, which is received from the sensor board unit 2 and the sensor board unit 4, in the buffer memory 6. The BMCNT 50 outputs the image data stored in the buffer memory 6 to the IPP 7. From among the image data stored in the buffer memory 6, the BMCNT 50, first, reads the image data of the front surface of the manuscript (hereinafter, referred to as "front surface data") and outputs it to the IPP 7. Then, the BMCNT 50 reads the image data of the back surface of the manuscript (hereinafter, referred to as "back surface data") and outputs it to the IPP 7.

The IPP 7 performs an image processing on the image data. The image processing performed by the IPP 7 includes scanner correction performed on the image data that is scanned by the scanning unit, the sensor board unit, or the like. The IPP 7 outputs, to the CDIC 8, the image data subjected to image processing. Furthermore, the IPP 7 outputs the image data received from the CDIC 8 to the video data control unit 9.

The video data control unit 9 controls the image data that is input to the image forming unit 10. The image forming unit 10 forms an image on a drum (not shown). The image formed on the drum is transferred onto a medium and is fixed thereon.

The CDIC 8 performs an enlargement process on the image data that is received from the IPP 7. Furthermore, the CDIC 8 performs a compression process and an expansion process on the image data. The CDIC 8 outputs the image data to be printed to the IPP 7. Furthermore, the CDIC 8 performs an interface process to the parallel bus 11 and conducts communication between the system controller 13 and the process controller 22.

The IMAC 12 performs various kinds of processes in accordance with a control performed by the system controller 13. The IMAC 12 also performs an access control of the memory 15. The IMAC 12 controls a connection to a network; develops print data, in a PC (not shown) connected via a network, to image data; and performs a compression process and an expansion process on the image data.

The system controller 13 performs the overall control of a system and manages the start-up of each resource. The hard disk 14 and the memory 15 stores therein the image data. The operation panel 17 receives instructions or the like from an operator. In this way, a function of the MFP is selected and thus the content of a process such as a copying function and a scanning function is set. The ROM 18 stores therein programs performed by the system controller 13. The FCU 19 transmits and receives facsimile data by connecting to a facsimile line.

The process controller 22 controls the flow of the image data. With the process controller 22 and the system controller 13, a plurality of jobs may be performed in parallel. Specifically, when a copying function, a scanning function, a printer output function, and the like are performed in parallel, the process controller 22 and the system controller 13 manage the resources of the scanning unit 1, the scanning unit 3, the image forming unit 10, and the parallel bus 11 and allocate the use right of the resources to each job.

The RAM 23 and the ROM 24 stores therein programs or the like executed by the process controller 22.

Figure 4:
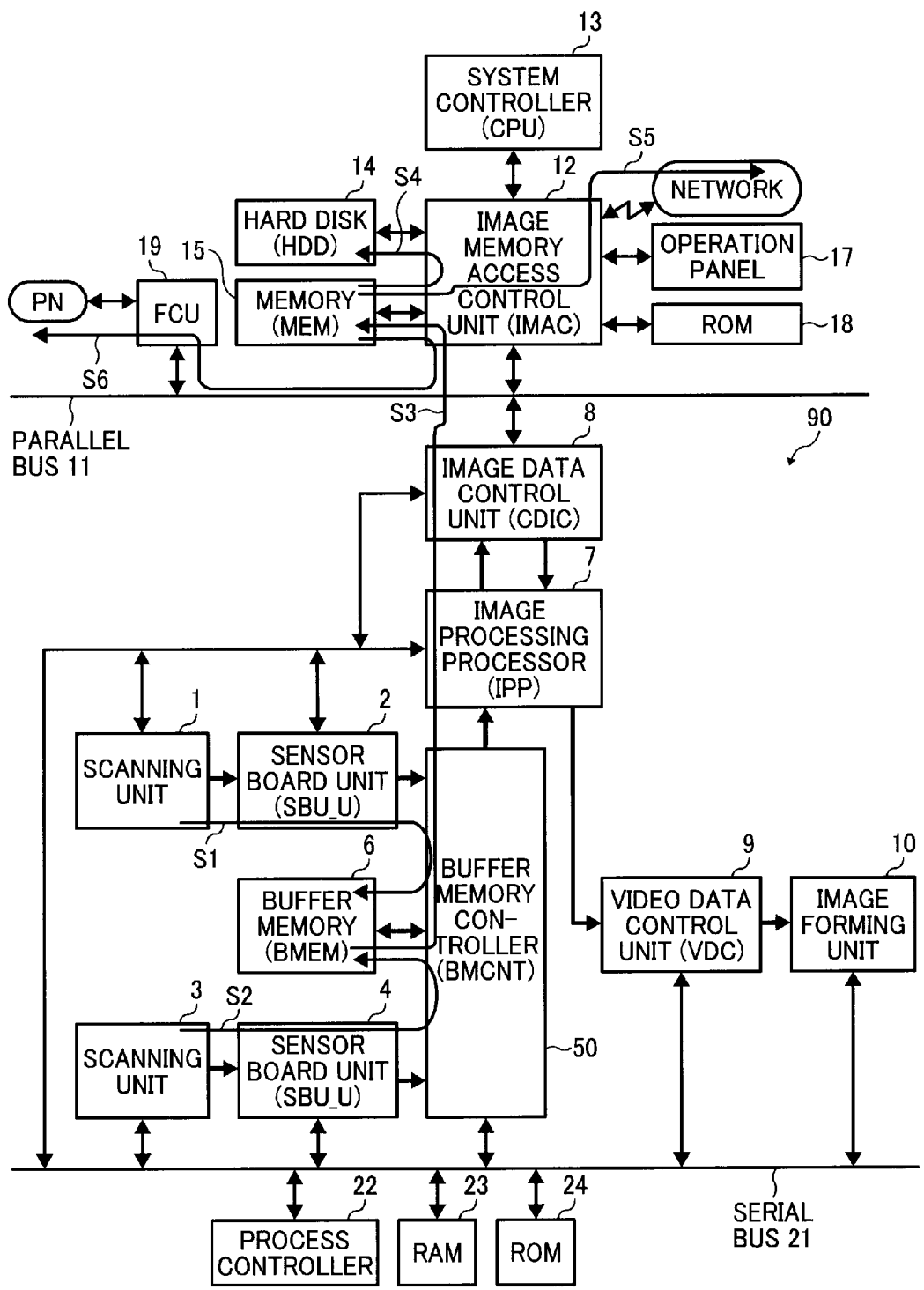
FIG. 4 is a schematic diagram illustrating the flow of the image data when scanned image data is enlarged.

FIG. 4 is a schematic diagram illustrating the flow of image data when scanned image data is enlarged. In FIG. 4, arrows S1 to S6, which are not illustrated in FIG. 3, indicate the flow of image data at each Step. At Step S1, a signal of a front surface image is input from the scanning unit 1, and image data of the front surface is created by the sensor board unit 2. The created image data is stored in the buffer memory 6 in accordance with a control performed by the BMCNT 50.

The process proceeds to Step S2 following Step S1. At Step S2, a signal of the back surface image is input from the scanning unit 3, image data of the back surface is created by the sensor board unit 4, and the created image data is stored in the buffer memory 6 in accordance with a control performed by the BMCNT 50.

The process proceeds to Step S3 following Step S2. At Step S3, the BMCNT 50 reads the front surface data that is stored in the buffer memory 6 and outputs it to the IPP 7. The front surface data is subjected to an enlargement process by the CDIC 8 and is stored in the memory 15 by the IMAC 12. Subsequently, the BMCNT 50 reads out the back surface data stored in the buffer memory and outputs the read out data to the IPP 7. The back surface data is subjected to an enlargement process by the CDIC 8 and is stored in the memory 15 by the IMAC 12.

The process proceeds to Step S4 following Step S3. At Step S4, the IMAC 12 reads out the front surface data and the back surface data that are stored in the memory 15 and stores the read out data in the hard disk 14. Step S4 may be skipped.

Alternatively, processes of Step S3 and Step S4 may be performed on the front surface data and then on the back surface data in a sequential manner. Specifically, after the front surface data is stored in the memory 15, the front surface data may be read from the memory 15 and stored in the hard disk 14. Subsequently, after the back surface data is stored in the memory 15, back surface data may be read from the memory 15 and stored in the hard disk 14.

The process proceeds to Step S5 following Step S3 or Step S4. At Step S5, the IMAC 12 reads out the front surface data and the back surface data that are stored in the memory 15 or the hard disk 14 and outputs the read out data to a PC that is connected via a network.

Alternatively, the process may proceed to Step S6 following Step S3 or Step S4. At Step S6, the FCU 19 reads out the front surface data and the back surface data stored in the memory 15 or the hard disk 14 and sends the read out data as facsimile data.

Figure 5:
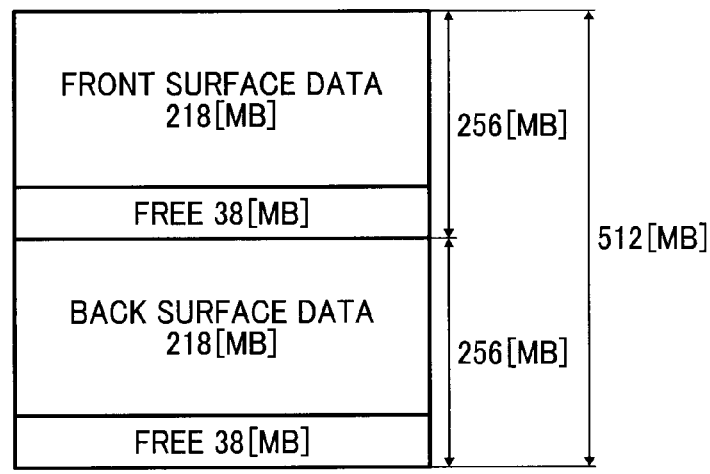
FIG. 5 is a schematic diagram illustrating an example of image data that is stored in a buffer memory (BMEM) 6.

FIG. 5 is a schematic diagram illustrating an example of image data that is stored in the buffer memory 6. In FIG. 5, the front surface data and back surface data are stored in an area in a memory. The area size illustrated in FIG. 5 is 512 MB. Area size of 256 MB is allocated to the front surface data and the back surface data, respectively.

Each area size of the front surface data and the back surface data stored in the area illustrated in FIG. 5 is 218 MB. An area size of 38 MB of the front surface data and an area size of 38 MB of the back surface data are free.

Figure 6:
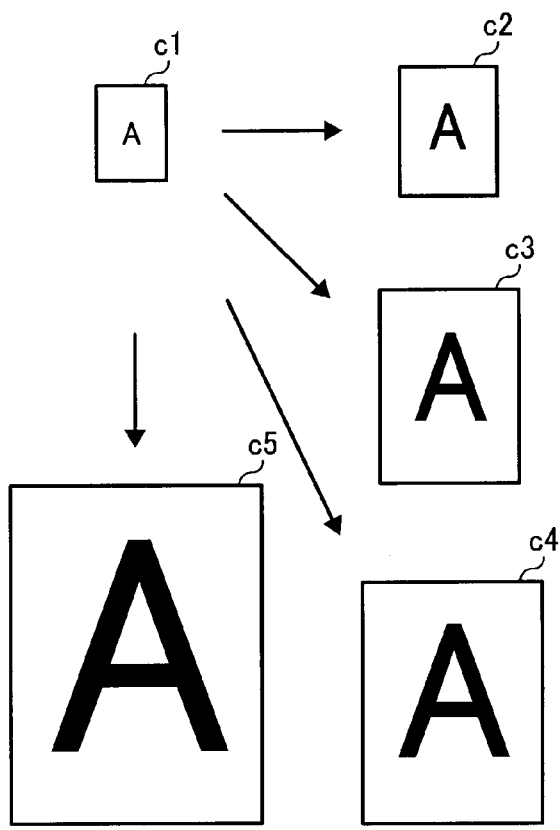
FIG. 6 is a schematic diagram illustrating examples of image data obtained before and after an enlargement process.

FIG. 6 is a schematic diagram illustrating examples of image data obtained before and after enlargement processing. A manuscript c1 is a manuscript of A6 size before enlargement processing. A copy c2 is an example in which the manuscript c1 is enlarged to A5 size. A copy c3 is an example in which the manuscript c1 is enlarged to A4 size. A copy c4 is an example in which the manuscript c1 is enlarged to A3 size. A copy c5 is an example in which the manuscript c1 is enlarged to A2 size.

In the examples illustrated in FIG. 6, the copy c2, which is enlarged from A6 to A5 in size, has an area twice as large as the manuscript. The copy c3, which is enlarged from A6 to A4 in size, has an area four times as large as the manuscript. The copy c4, which is enlarged from A6 to A3 in size, has an area that is approximately eight times as large as the manuscript. The copy c5, which is enlarged form A6 to A2 in size, has an area 16 times as large as the manuscript.

Figure 7:
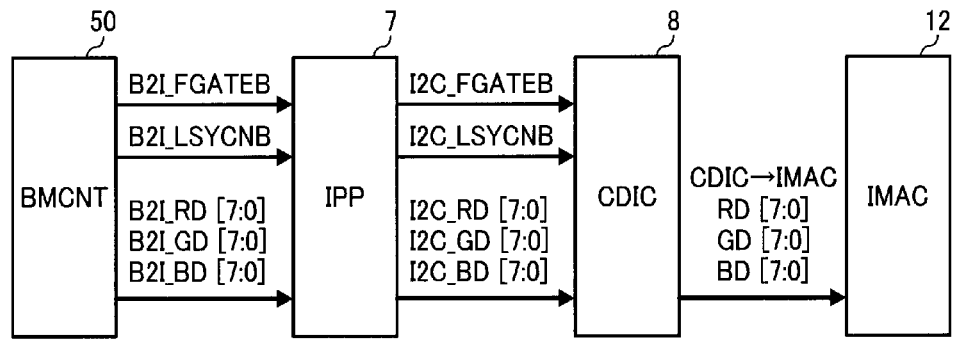
FIG. 7 is a schematic diagram illustrating image data and signals of the image data, which are input to and output from each unit.

FIG. 7 is a schematic diagram illustrating image data and signals of the image data, which are input and output among the BMCNT 50, the IPP 7, the CDIC 8, and the IMAC 12. The image data signals output from the BMCNT 50 to the IPP 7 correspond to three components, i.e., B2I_RD, B2I_GD, and B2I_BD. Each of the signals has an 8-bit bus width. Symbol "B2I" represents an output from the BMCNT 50 to the IPP 7.

From the BMCNT 50 to the IPP 7, two synchronization signals, i.e., B2I_FGATEB and B2I_LSYNCB, are output. These synchronization signals are respectively synchronized with a start timing and an end timing of image data and synchronized with the start timing and then end timing of a single line included in the image data. Signal values of B2I_RD, B2I_GD, and B2I_BD, which are output when the synchronization signal indicates "active", have pixel values of red, green, and blue, respectively.

The image data that corresponds to three components, i.e., I2C_RD, I2C_GD, and I2C_BD and two synchronization signals, i.e., I2C_FGATEB and I2C_LSYNCB are output from the IPP 7 to the CDIC 8. The image data I2C_RD, I2C_GD, and I2C_BD belong to the same type signals that are input to the IPP 7. Symbol "I2C" represents an output from the IPP 7 to the CDIC 8.

Furthermore, from the CDIC to the IMAC 12, image data that corresponds to three components, i.e., RD, GD, and BD, is output. In FIG. 7, an output from the CDIC 8 to the IMAC 12 is represented by "CDIC→IMAC".

Figure 8:
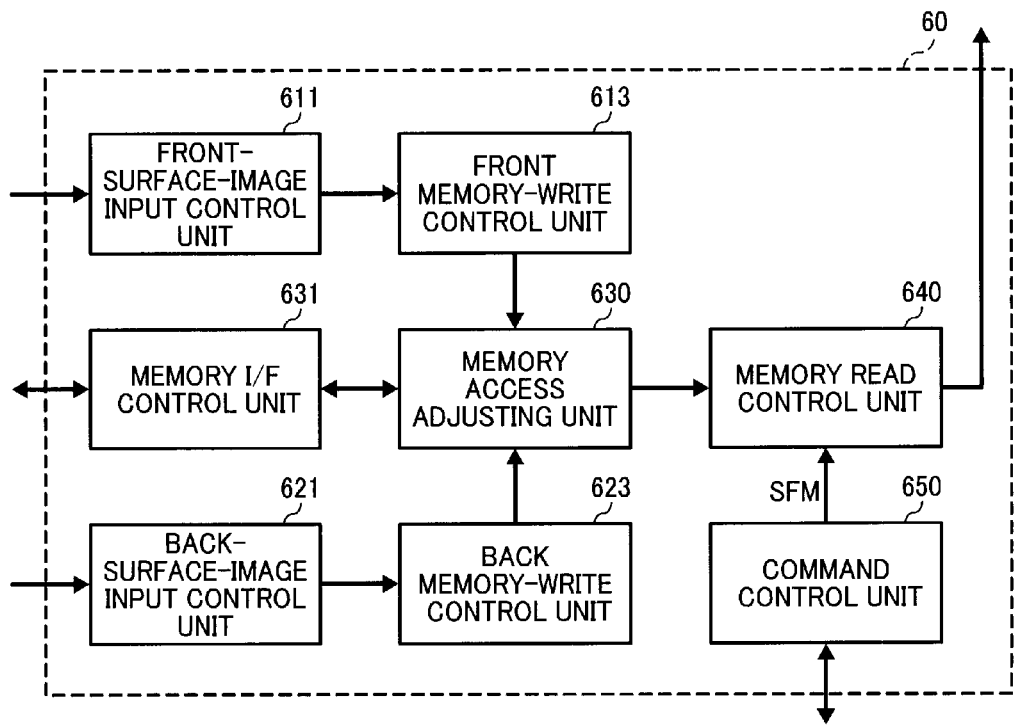
FIG. 8 is a schematic diagram illustrating the configuration of a conventional BMCNT 60.

Prior to explaining the BMCNT 50 according to the present embodiment, the configuration and the operation of the BMCNT 60 according to a previous configuration will be explained with reference to FIGS. 8 to 16. The BMCNT 60 illustrated in FIG. 8 is arranged at a position that corresponds to the position of the BMCNT 50, the BMCNT 60 is arranged in the control unit 90.

The BMCNT 60 includes a front-surface-image input control unit 611, a front memory-write control unit 613, a back-surface-image input control unit 621, a back memory-write control unit 623, a memory access arbitration unit 630, a memory I/F control unit 631, a memory-read control unit 640, and a command control unit 650.

The front-surface-image input control unit 611 performs input control on the front surface data received from the sensor board unit 2. The front memory-write control unit 613 controls the writing of front surface data to the buffer memory 6. The back-surface-image input control unit 621 controls the input from the sensor board unit 4. The back memory-write control unit 623 controls the writing of back surface data in the buffer memory 6.

The memory access arbitration unit 630 arbitrates writing to the buffer memory 6 by the front memory-write control unit 613 and the back memory-write control unit 623, and also arbitrates reading from the buffer memory 6 by the memory-read control unit 640. The memory I/F control unit 631 performs an interface process toward the buffer memory 6.

The memory-read control unit 640 controls of reading, from the buffer memory 6, front surface data and back surface data. The command control unit 650 outputs, to the memory-read control unit 640, a control signal SFM that is used to control the timing of the reading.

FIGS. 9 to 12 are schematic diagrams illustrating the timing at which, with the configuration including the BMCNT 60, a signal that is read from the buffer memory 6 is output to the IPP 7 and is then output to the IMAC 12 after the CDIC 8 performs an enlargement process.

Figure 9:
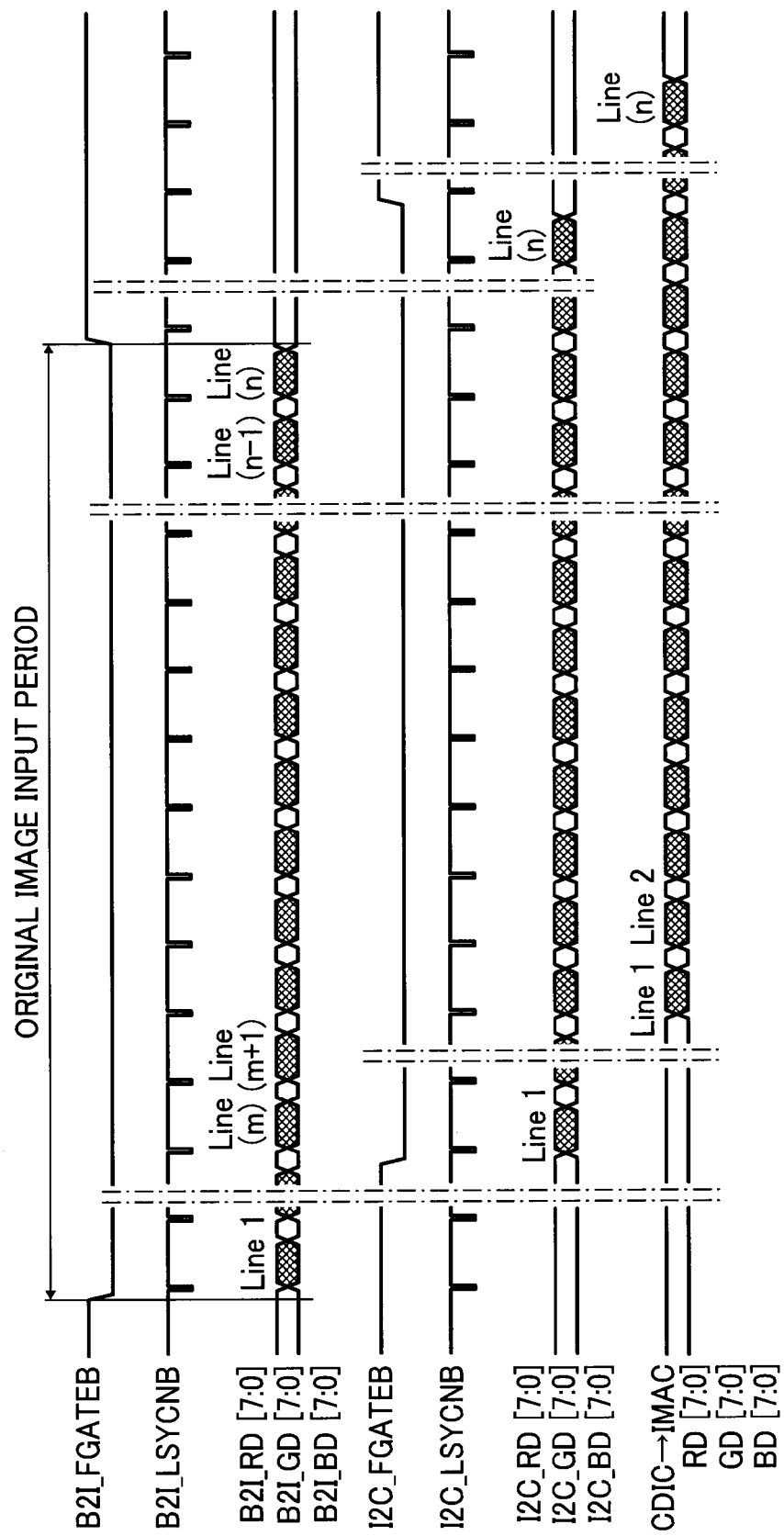
FIG. 9 is a timing chart illustrating signals obtained when a same-size process is performed with the conventional configuration.

FIG. 9 a timing chart illustrating an example of a same-size process. All of the following cycles, which are illustrated in FIG. 9, are the same: a cycle of every line of a signal such as the B2I_RD in which a signal is read from the buffer memory 6 and is input to the IPP 7; a cycle of every line of a signal such as the I2C_RD in which a signal is output from the IPP 7 to the CDIC 8; and a cycle of every line of the signal CDIC→IMAC in which the signal is output from the CDIC 8 to the IMAC 12.

Figure 10:
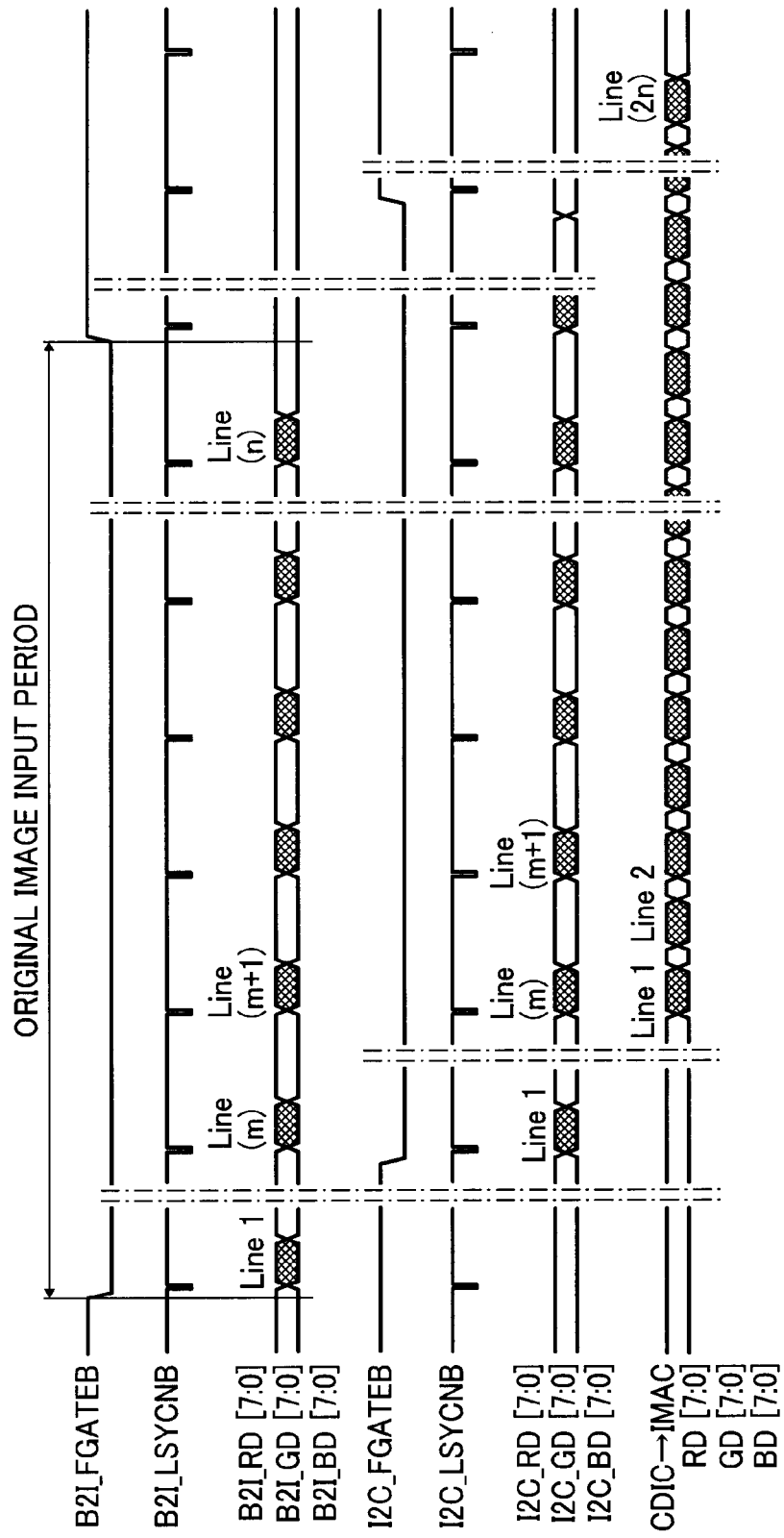
FIG. 10 is a timing chart illustrating signals obtained when a double-sized process is performed on the signals with the conventional configuration.

FIG. 10 is a timing chart illustrating an example in which a double-sized enlargement process is performed on signals. The following cycles, which are illustrated in FIG. 10, are the same: a cycle of every line of a signal such as the B2I_RD in which the signal is read from the buffer memory 6 and is input to the IPP 7; and a cycle of every line of a signal such as the I2C_RD in which the signal is output from the IPP 7 to the CDIC 8. The length of the cycle of each line of the signal CDICI→MAC in which a signal that is output from the CDIC 8 to the IMAC 12 is half of the length of the two cycles in the previous sentence. Accordingly, an enlargement process in which a single line that is read from the buffer memory 6 is used twice at a time is realized.

Figure 11:
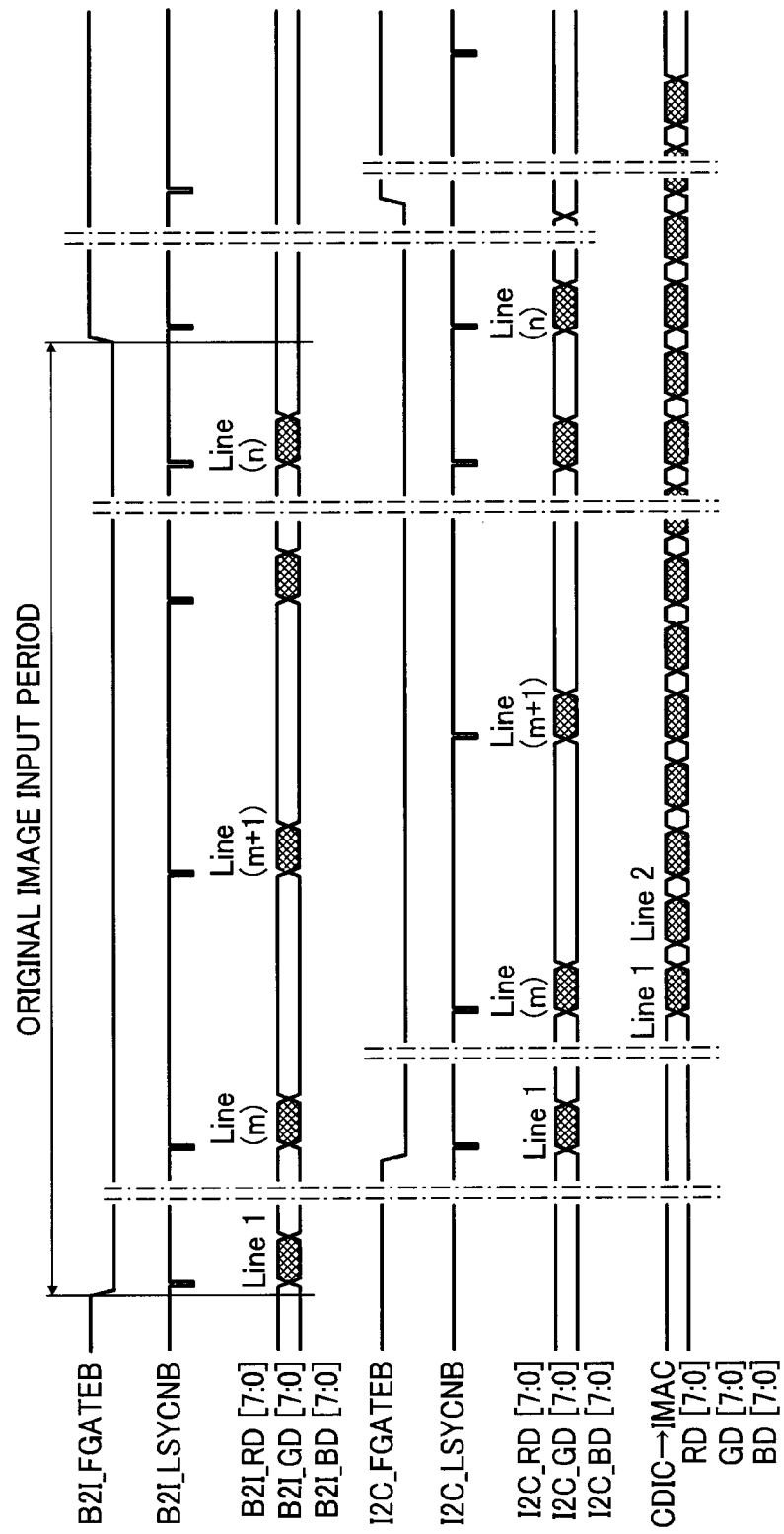
FIG. 11 is a timing chart illustrating signals obtained when a quadruple-sized process is performed on the signals with the conventional configuration.

FIG. 11 is a timing chart illustrating an example in which a quadruple-sized enlargement process is performed on signals. The following cycles, which are illustrated in FIG. 11, are the same: a cycle of each line of a signal such as the B2I_RD in which a signal is read from the buffer memory 6 and is input to the IPP 7; and a cycle of every line of a signal such as the I2C_RD in which a signal is output from the IPP 7 to the CDIC 8. The length of the cycle of every line of the signal CDIC→IMAC that is output from the CDIC 8 to the IMAC 12 is one fourth of the length of these two cycles in the previous sentence. Accordingly, an enlargement process in which a single line that is read from the buffer memory 6 is used four at a time is realized.

Figure 12:
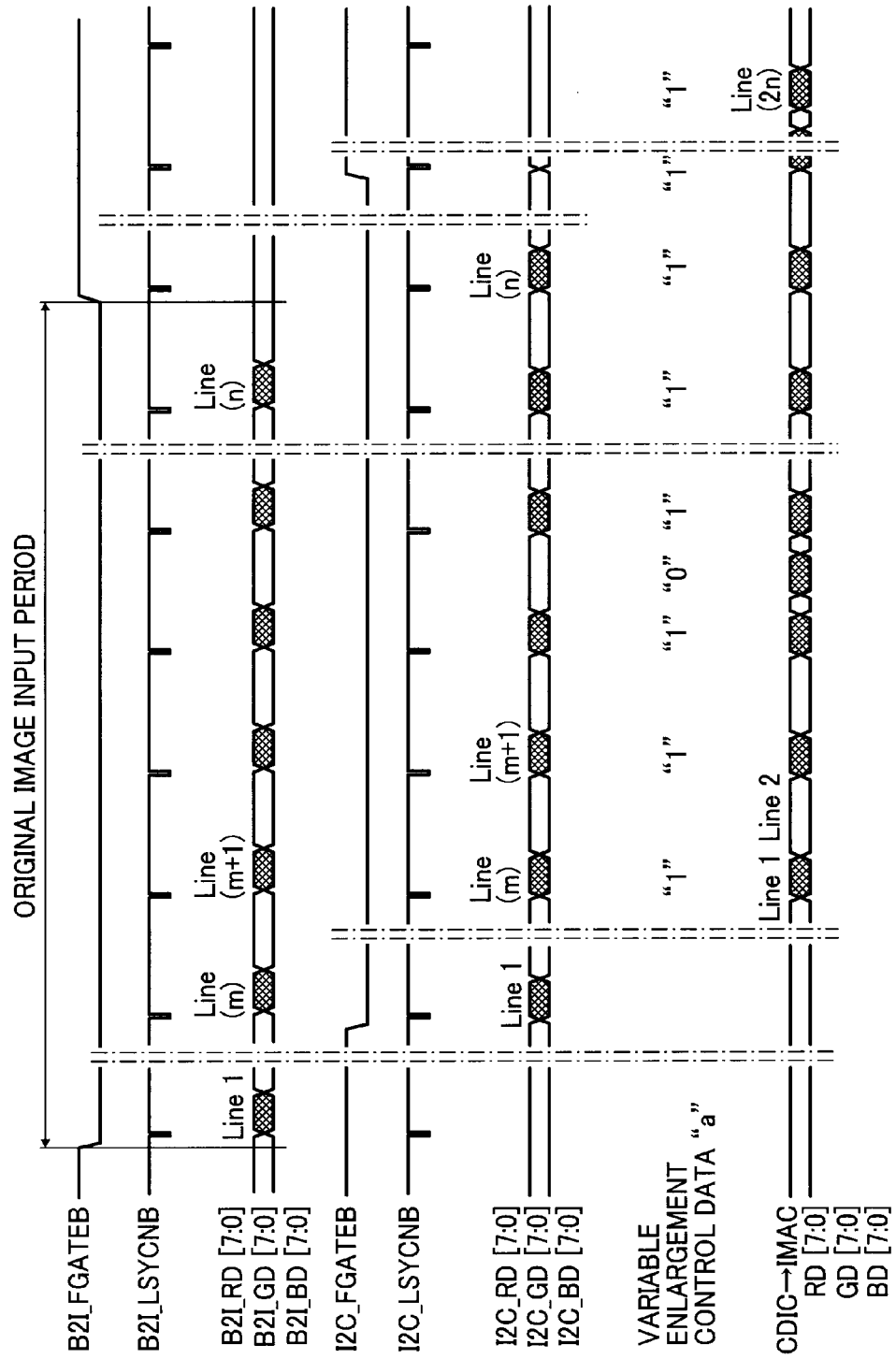
FIG. 12 is a timing chart illustrating signals obtained when a 141%-enlargement process is performed on the signals with the conventional configuration.

FIG. 12 is a timing chart illustrating an example in which an enlargement process by about 1.4 times (141%) is performed on a signal. With this process, a single line before enlargement corresponds to a line after enlargement by a factor of 1.4. In practice, a cycle in which the output of a line obtained after enlargement varies in such a manner that the ratio of the number of lines obtained before enlargement to that obtained after enlargement is an integer ratio.

In FIG. 12, the following cycles are the same: a cycle of each line of a signal such as the B2I_RD in which a signal is read from the buffer memory 6 and is input to the IPP 7; and a cycle of each line of a signal such as the I2C_RD in which a signal is output from the IPP 7 to the CDIC 8. The cycle of each line of the signal CDIC→IMAC that is output from the CDIC 8 to the IMAC 12 varies depending on the line. Accordingly, an enlargement process in which a single line that is read from the buffer memory 6 is used approximately 1.4 times, on average, at a time is realized.

Figures 13, 14:
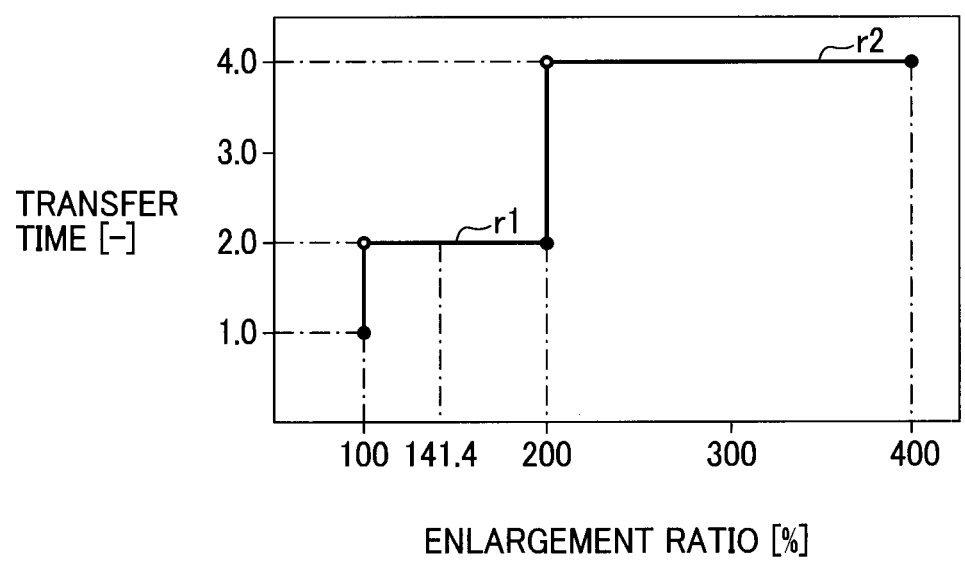
FIG. 13 is a schematic diagram illustrating an example of a control signal SFM.
FIG. 14 is a schematic diagram illustrating the correlation between the enlargement ratio and the transfer time of the image data that is read from a buffer memory 6.

FIG. 13 is a schematic diagram illustrating an example of the control signal SFM that is output from the command control unit 650 to the memory-read control unit 640. The control signal SFM is a 2-bit signal. Values "00" and "01" are output when the same-size process or a reduction process is performed. The value "10" is output when an enlargement ratio is between 101% and 200%. The value "11" is output when the enlargement ratio is between 201% and 400%.

FIG. 14 is a schematic diagram illustrating the correlation between an enlargement ratio and the transfer time of the image data that is read from the buffer memory 6. The correlation illustrated in FIG. 14 is an example obtained when image data is read in accordance with the control signal SFM illustrated in FIG. 13. In FIG. 14, the transfer time when an enlargement ratio of 100% is defined as 1.0, when the enlargement ratio is between 100% and 200% (range r1), the transfer time becomes 2.0, and, when the enlargement ratio is between 201% and 400% (range r2), the transfer time becomes 4.0.

Accordingly, the control signal SFM may be associated with three cases: a case in which the enlargement ratio is 100% or less; a case in which the enlargement ratio is over 100% and 200% or less; and a case in which the enlargement ratio is over 200% and 400% or less. With the control signal SFM, controlling the timing of the image data, such as the B2I_RD included in the timing charts illustrated in FIGS. 9 to 12, that is output from the BMCNT 50 may be realized.

FIGS. 15A to 15E are schematic diagrams illustrating examples of control signals that are used when an enlargement control is performed. The control signals are used in the CDIC 8. In FIGS. 15A and 15E, values of two control signals, i.e., a control signal "a" and a control signal "b", are represented by a hexadecimal display and a binary display, respectively. Each of the control signals corresponds to every line that is contained in the image data after the enlargement process is over. In the present embodiment, the control signal "a" is a binary value with one bit and the control signal "b" has eight values represented by three bits.

The control signal "a" represents whether a line, which is used in creating the line that has been subjected to the enlargement process, is the same as the line that was processed in the immediately previous process. When a value of the control signal "a" is one, a line that is different from the line that was processed in the immediately previous process is used. When the value of the control signal "a" is zero, the same line as that processed in the immediately previous process is used.

The control signal "b" represents a filter phase that is used when a line that has been subjected to the enlargement process is created. A filter phase or a filter coefficient of a filter that is used for the enlargement process varies in accordance with every value of the control signal "b". Accordingly, even when a process is performed using the same line, it is possible to make a filter coefficient for multiplying every pixel different.

FIG. 15A is a schematic diagram illustrating an example of a control signal obtained when a same-size process, i.e., the enlargement ratio is 100%, is performed. When the enlargement ratio is 100%, the value of the control signal "a" is one and the value of the control signal "b" is zero. When a process is performed under the condition that the enlargement ratio is 100%, values of the control signal are always the same, namely, the control signal "a" is one and the control signal "b" is zero.

FIG. 15B is a schematic diagram illustrating an example of a control signal obtained when an enlargement process, in which an enlargement ratio is 200%, is performed. When the enlargement ratio is 200%, a line that has not been subjected to the enlargement process is used for a process for creating two lines that have been subjected to the enlargement process. Accordingly, for every second line, the control signal a has a value of one.

FIG. 15C is a schematic diagram illustrating an example of a control signal obtained when an enlargement process, in which an enlargement ratio is 300%, is performed. When the enlargement ratio is 300%, a line that has not been subjected to the enlargement process is used for a process for creating three lines that have been subjected to the enlargement process. Accordingly, for every third line, the control signal a has a value of one.

FIG. 15D is a schematic diagram illustrating an example of a control signal obtained when an enlargement process, in which an enlargement ratio is 400%, is performed. When the enlargement ratio is 400%, a line that has not been subjected to the enlargement process is used for a process for creating four lines that have been subjected to the enlargement process. Accordingly, for every fourth line, the control signal a has a value of one.

FIG. 15E is a schematic diagram illustrating an example of a control signal obtained when an enlargement process, in which an enlargement ratio is 141%, is performed. When the enlargement ratio is 141%, a line that has not been subjected to the enlargement process is used in a process for creating a line that has been subjected to the enlargement process and that is, on average, 1.4 times longer than that that has not been subjected to the enlargement process. In the example illustrated in FIG. 15E, positions consecutively having the value of the control signal "a" is one appear in the case in which the enlargement process is performed at 2-line intervals and in the case in which the enlargement process is performed at 3-line intervals. Accordingly, it is possible to realize a process in which a line that has not yet been subjected to the enlargement process is used, on average, 1.4 times at a time.

Figure 16:
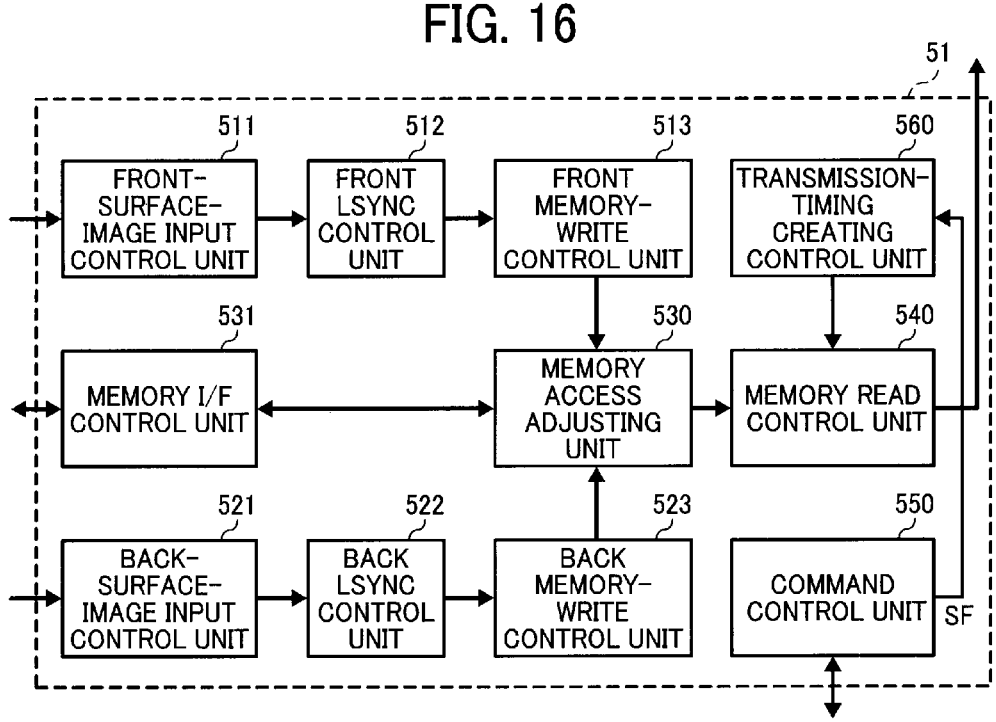
FIG. 16 is a functional block diagram illustrating an example configuration of a BMCNT 51 according to the present embodiment.
Figure 17:
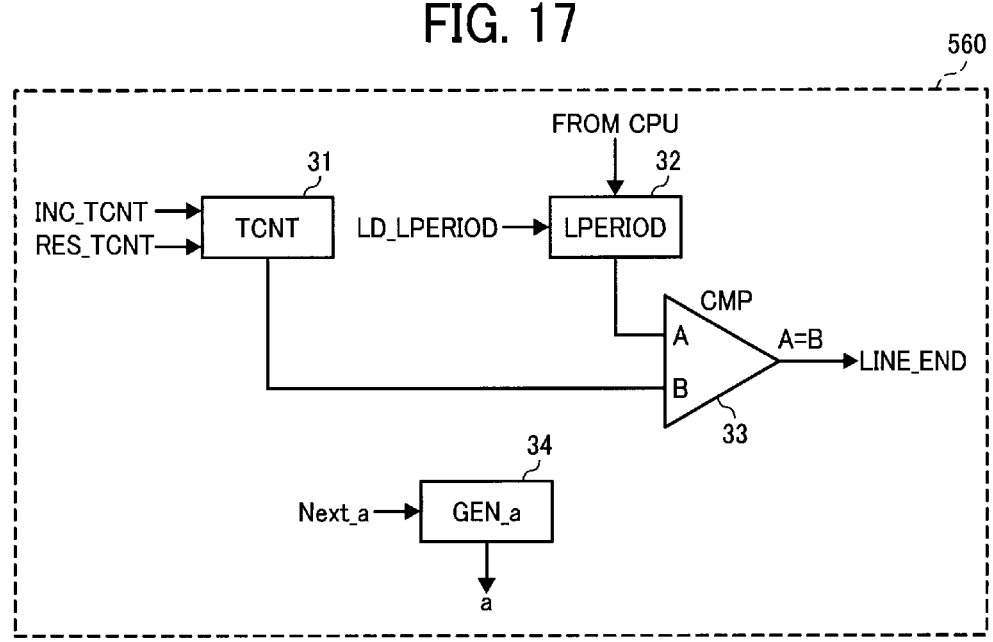
FIG. 17 is a schematic diagram illustrating an example configuration of a circuit that implements the function of a transmission-timing creating control unit 560.
Figure 18:
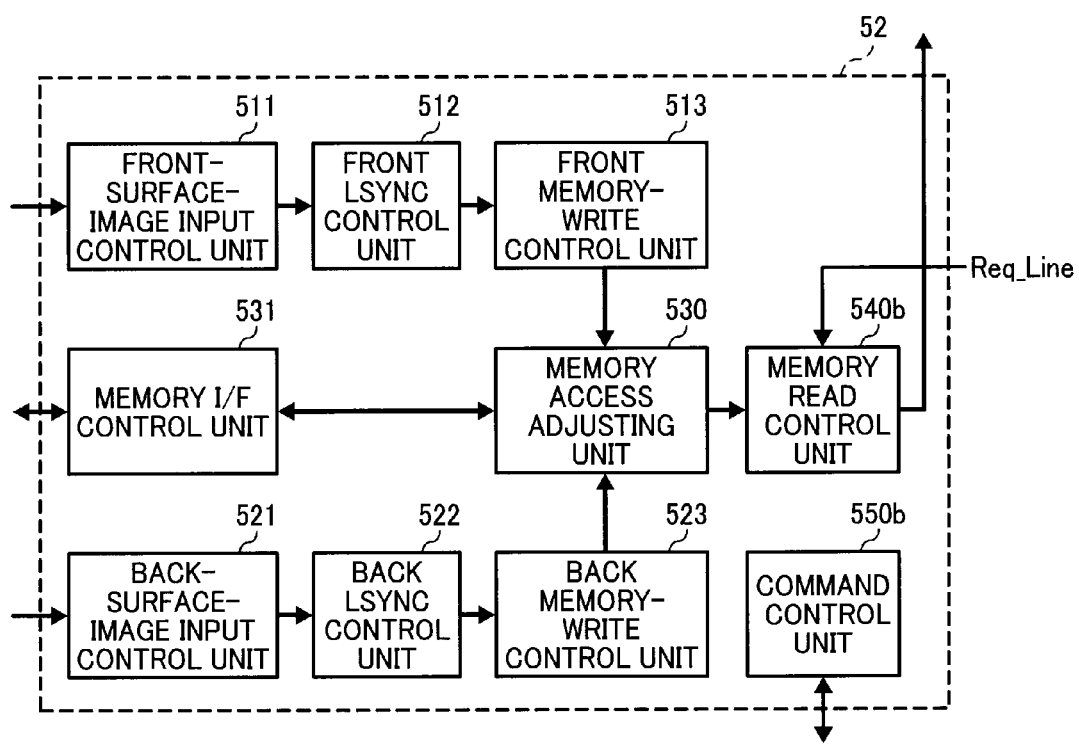
FIG. 18 is a functional block diagram illustrating an example configuration of a BMCNT 52 according to the present embodiment.

FIGS. 16 to 18 are functional block diagrams illustrating example configurations of the BMCNT 51 and the BMCNT 52 according to the present embodiment. The BMCNT 51 and the BMCNT 52 may be replaced by the BMCNT 50 in the control unit 90 illustrated in FIG. 3.

FIG. 16 is a functional block diagram illustrating an example configuration of the BMCNT 51. The BMCNT 51 includes a front-surface-image input control unit 511, a front LSYNC control unit 512, a front memory-write control unit 513, a back-surface-image input control unit 521, a back LSYNC control unit 522, a back memory-write control unit 523, a memory access adjusting unit 530, a memory I/F control unit 531, a memory-read control unit 540, a command control unit 550, and a transmission-timing creating control unit 560.

From among the units included in the BMCNT 51, the front-surface-image input control unit 511, the back-surface-image input control unit 521, the memory access adjusting unit 530, and the memory I/F control unit 531 have the same function and configuration as those assigned the same names included in the BMCNT 50, and therefore a explanation thereof will be omitted here.

The front LSYNC control unit 512 performs a line synchronization control when the front surface data is being stored in the buffer memory 6. The back LSYNC control unit 522 performs a line synchronization control when the back surface data is being stored in the buffer memory 6. The line synchronization controlled by the front LSYNC control unit 512 and the back LSYNC control unit 522 have equal intervals, for example, for every line.

The front memory-write control unit 513 stores the front surface data in the buffer memory 6 in accordance with the line synchronization controlled by the front LSYNC control unit 512. The back memory-write control unit 523 stores the back surface data in the buffer memory 6 in accordance with the line synchronization controlled by the back LSYNC control unit 522.

The transmission-timing creating control unit 560 creates a control signal for the transmission timing at which the image data is sent from the BMCNT 50 to the IPP 7. The transmission-timing creating control unit 560 creates a control signal on the basis of information on the enlargement ratio that is received from the command control unit 550. The control signal created by the transmission-timing creating control unit 560 is the control signal "a" illustrated in FIG. 14 and FIGS. 15A to 15E. Accordingly, each of the lines may be output at the timing that is used by the CDIC 8 when the CDIC 8 performs the enlargement process.

The memory-read control unit 540 controls the reading of the front surface data and the back surface data from the buffer memory 6. The memory-read control unit 540 reads out, from the buffer memory 6, the image data in accordance with the control signal "a" that is created by the transmission-timing creating control unit 560.

The command control unit 550 outputs the control signal SF to the transmission-timing creating control unit 560. The control signal SF contains information on an enlargement ratio and specifically contains information on a value of the enlargement ratio itself. Furthermore, when the control signal SF corresponds to information on the value of the enlargement ratio itself, a "variable enlargement ratio SF" may be used.

FIG. 17 is a schematic diagram illustrating an example of configuration of a circuit that realizes the function of the transmission-timing creating control unit 560. The transmission-timing creating control unit 560 illustrated in FIG. 17 includes four circuits: a TCNT 31, an LPERIOD 32, a comparator 33, and a GEN_a34. The TCNT 31 is a counter that determines the output cycle for every line. The TCNT 31 creates a control signal B that determines the output cycle for every line in accordance with two input signals, i.e., INC_TCNT and RES_TCNT. The INC_TCNT increments the output cycle counter of a line. The RES_TCNT resets the output cycle counter of a line.

The LPERIOD 32 is a counter that controls the output cycle of the line data. The LPERIOD 32 monitors the output cycle of a single line using a signal from the CPU and using an LD_LPERIOD that is received.

The comparator CMP compares a signal A, which is output from the LPERIOD 32, with a signal B, which is output from the TCNT 31. When both the signals have the same value, the LINE_END signal that is to be output has a value indicating the end of the line.

The GEN_a 34 creates a control signal "a". Specifically, the GEN_a 34 creates, using the received signal Next_a, a control signal "a" that corresponds to every line that is output after having been subjected to the enlargement process.

FIG. 18 is a functional block diagram illustrating an example configuration of the BMCNT 52. The BMCNT 52 includes the front-surface-image input control unit 511, the front LSYNC control unit 512, the front memory-write control unit 513, the back-surface-image input control unit 521, the back LSYNC control unit 522, the back memory-write control unit 523, the memory access adjusting unit 530, the memory I/F control unit 531, a memory-read control unit 540b, and a command control unit 550b. In the BMCNT 52, those units having the same function as those in the BMCNT 51 illustrated in FIG. 16 are assigned the same reference numerals, and therefore a description thereof is omitted.

The memory-read control unit 540b creates a control signal "a" using a signal Req_Line that is received. The signal Req_Line is output from the CDIC 8 in accordance with the control signal "a". The signal Req_Line has a value of one and a value of zero with the same cycle as that of the control signal "a".

Figure 19:
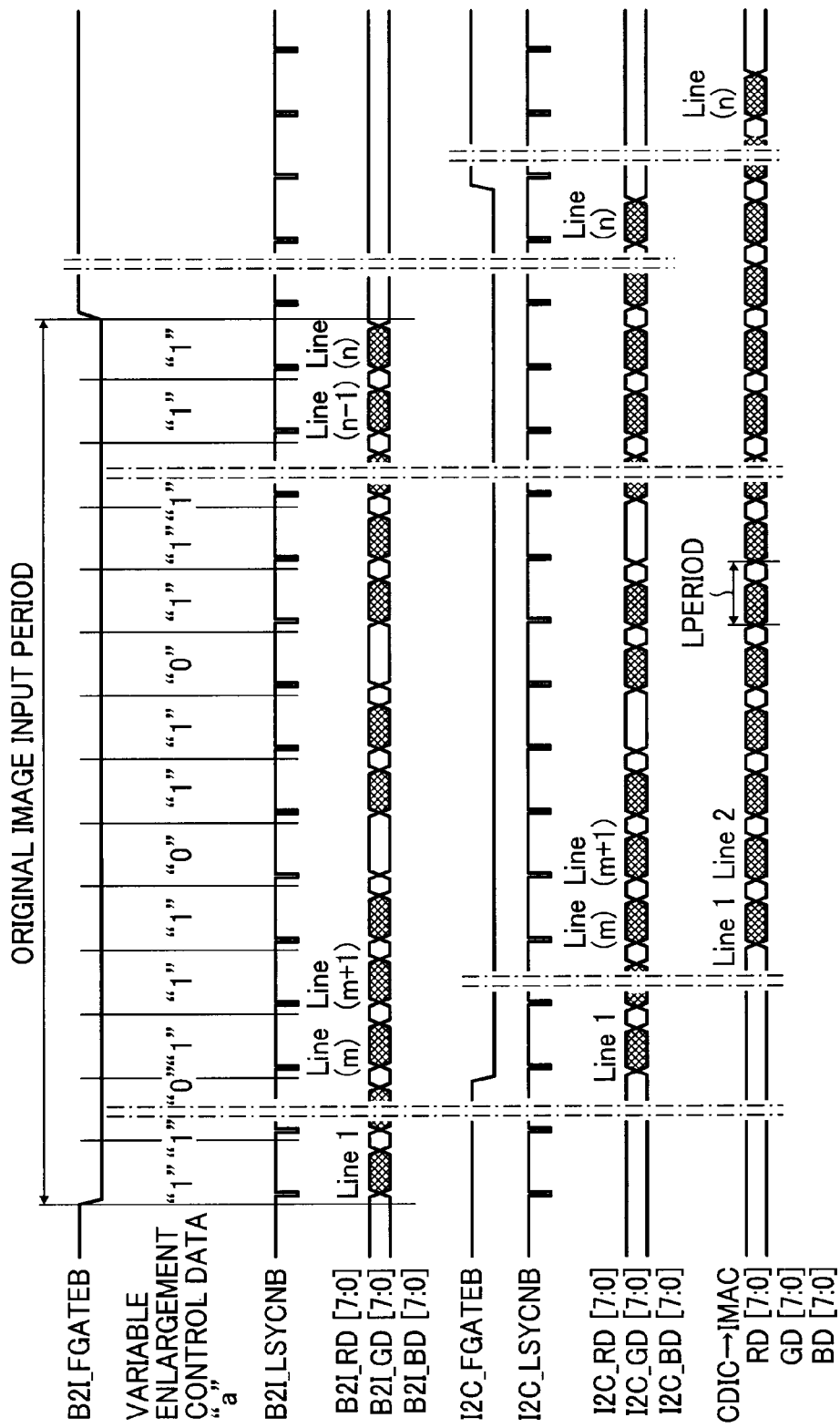
FIG. 19 is a timing chart illustrating the timing at which the image data is input to and output from a control unit 90 that has the BMCNT 51.

FIG. 19 is a timing chart illustrating a timing at which image data is input to and output from the control unit 90 that has the BMCNT 51 illustrated in FIG. 16. In the example illustrated in FIG. 19, a 141%-enlargement process is performed. In FIG. 19, a control signal "a" is created in the BMCNT 51. In the BMCNT 51, the output cycle of the image data B2I that is output from the BMCNT 51 to the IPP 7 is synchronized with the control signal "a". In FIG. 19, the control signal "a" is represented by [variable-enlargement-control-data "a"].

In FIG. 19, in each component of the image data CDIC→IMAC that is output from the CDIC 8 to the IMAC 12, an output cycle LPERIOD for each line is constant, thus realizing an effective output.

Figure 20:
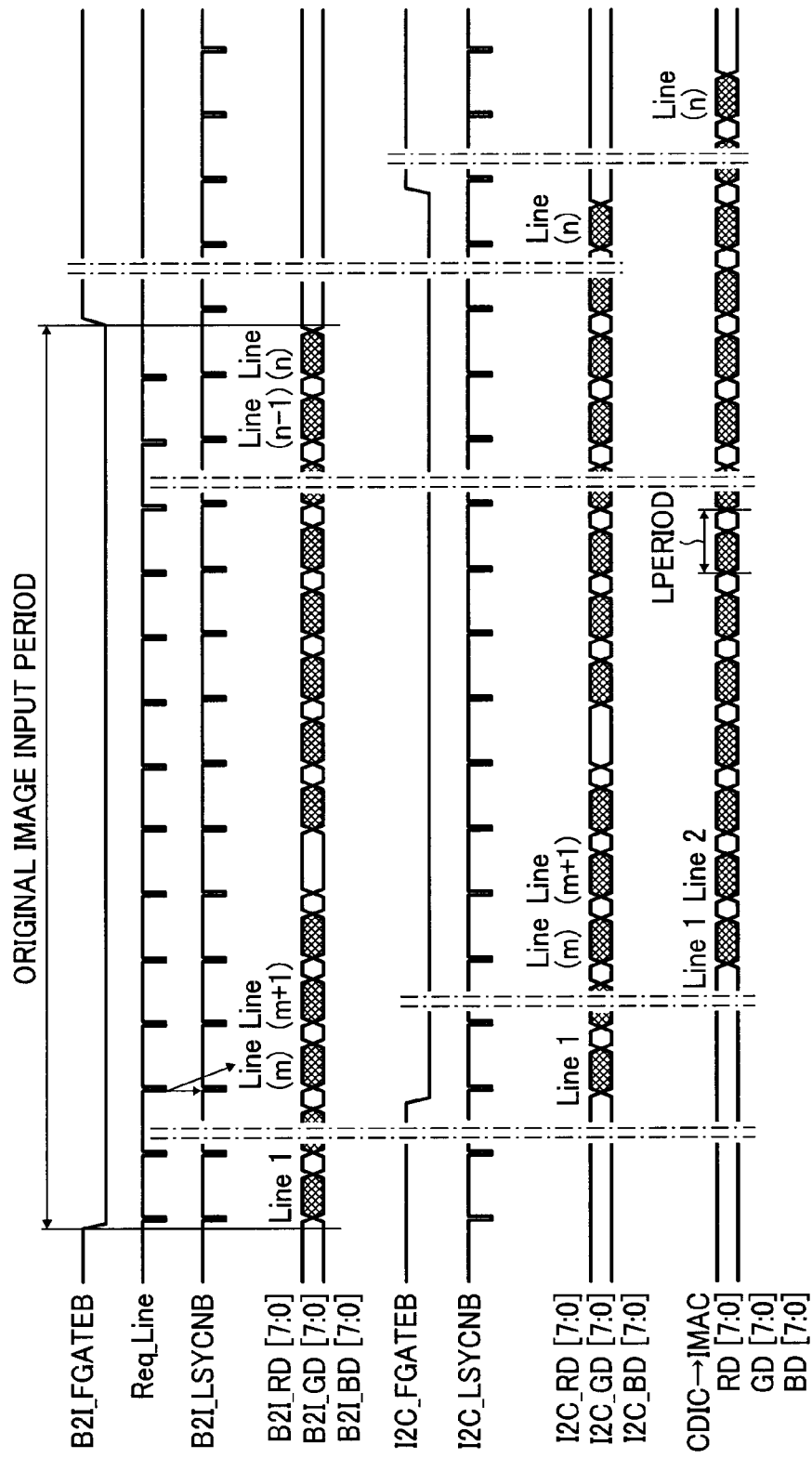
FIG. 20 is a timing chart illustrating the timing at which the image data is input to and output from the control unit 90 that has the BMCNT 52.

FIG. 20 is a timing chart illustrating timings at which image data is input to and output from the control unit 90 that has the BMCNT 52 illustrated in FIG. 18. In the example illustrated in FIG. 20, a 141%-enlargement process is performed. In FIG. 20, the BMCNT 52 realizes an output, for every line, in accordance with Req_Line that is the same type of signal as the control signal "a". Accordingly, the output cycle of the image data B2I that is output from the BMCNT 52 to the IPP 7 is synchronized with the Req_Line.

In FIG. 20, in a similar manner as in FIG. 19, in each component of the image data CDIC→IMAC that is output from the CDIC 8 to the IMAC 12, the output cycle LPERIOD for each line is constant, thus realizing an effective output.

Figure 21:
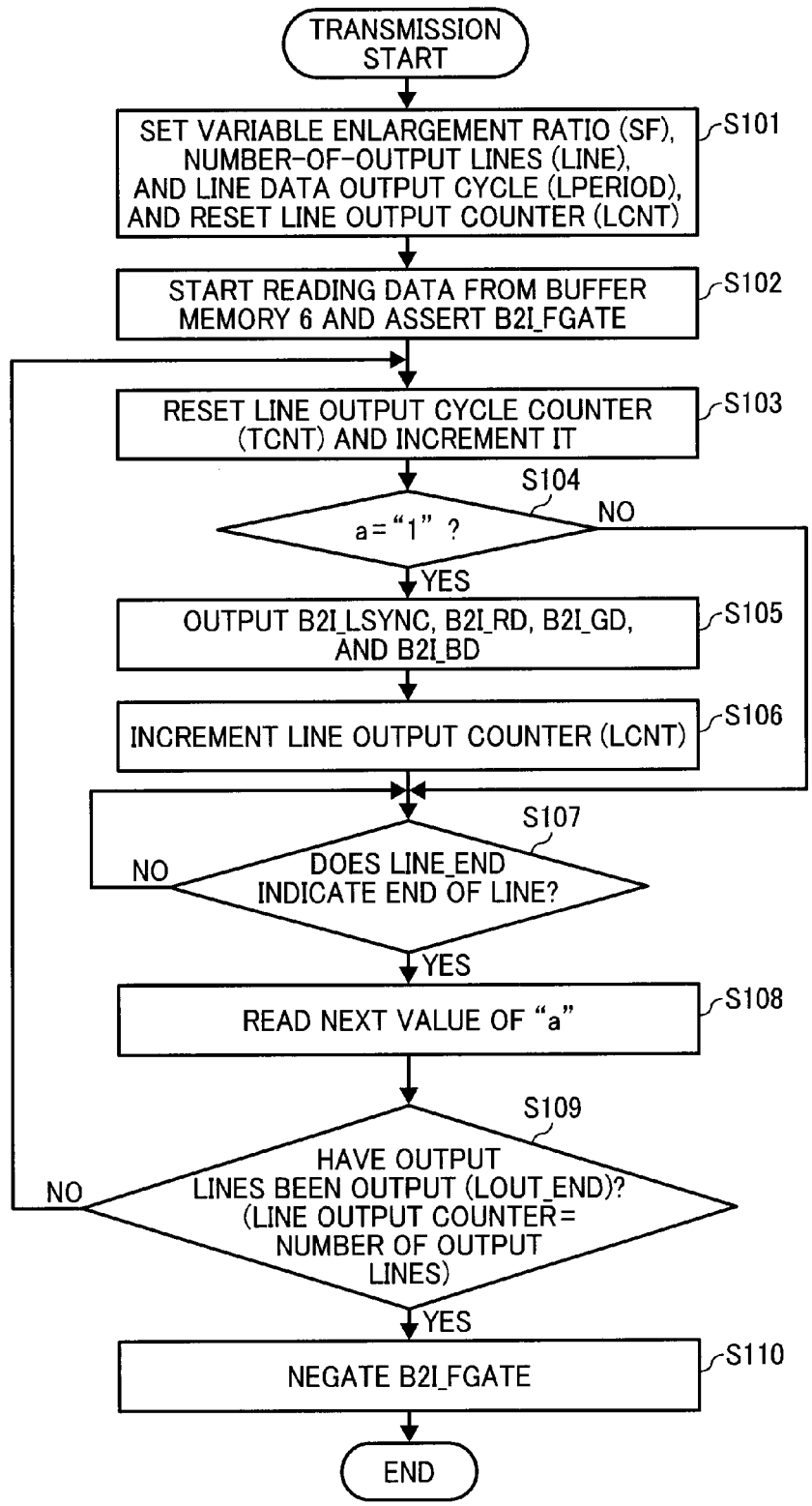
FIG. 21 is a flowchart illustrating a method of controlling the image scanning apparatus executed by the BMCNT 51.
Figure 22:
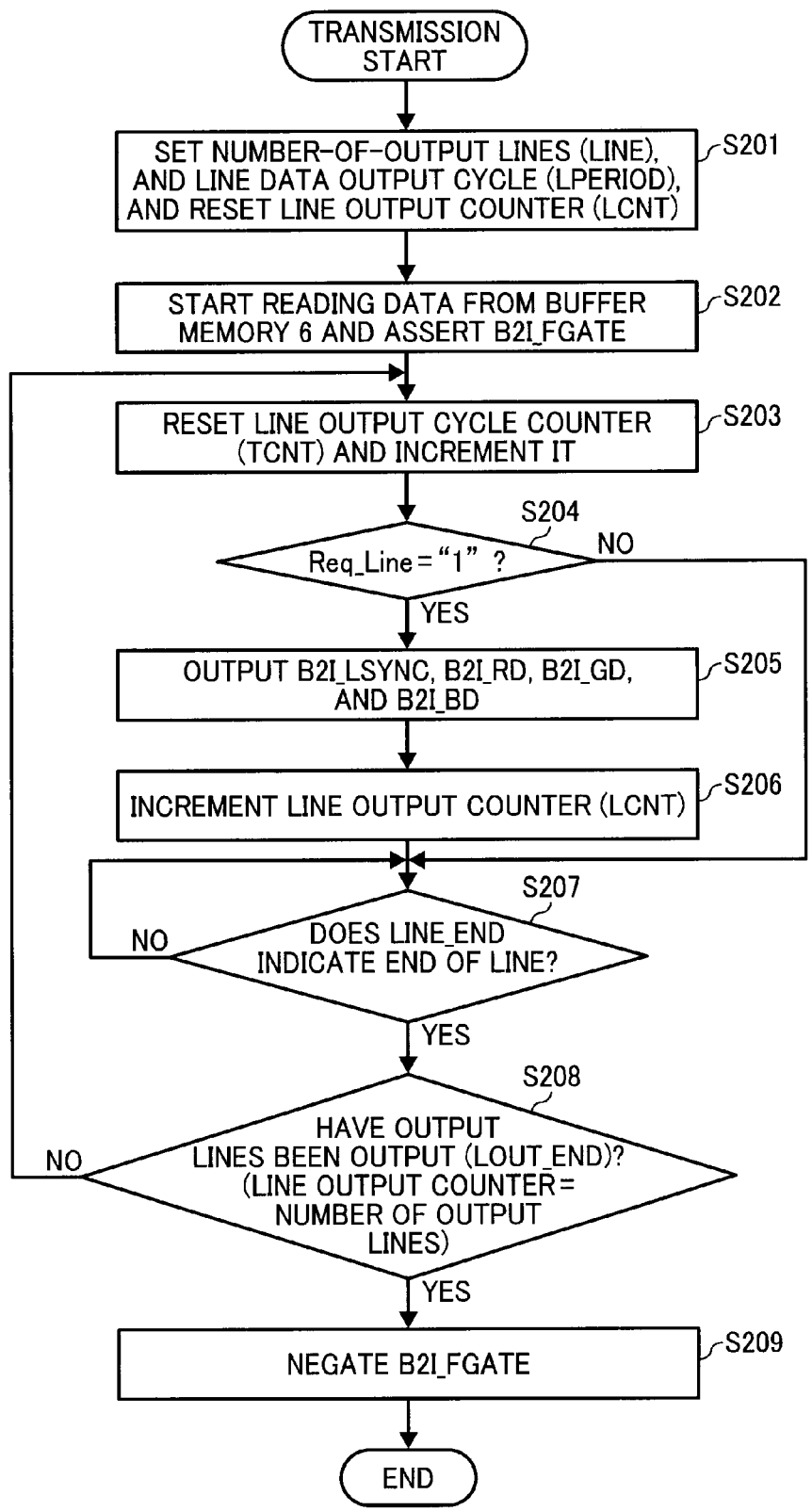
FIG. 22 is a flowchart illustrating a method of controlling the image scanning apparatus executed by the BMCNT 52.

FIGS. 21 and 22 are flowcharts illustrating a method of controlling the image scanning apparatus according to the present embodiment. FIG. 21 is the flow of a control method performed by the BMCNT 51. FIG. 22 indicates the flow of a control method performed by the BMCNT 52.

At Step S101 in FIG. 21, in the command control unit 550, a variable-enlargement ratio SF and a number-of-output lines LINE are set. Furthermore, a line output counter LCNT, which counts the number of lines of image data that has been subjected to the enlargement process, is reset. At Step S101, a line data output cycle LPERIOD, which is an output cycle for every line of image data subjected to the enlargement process, is set.

After Step S101, the process proceeds to Step S102, where a process for reading from the buffer memory 6 is started up. Specifically, the B2I_FGATE signal is asserted.

After Step S102, the process proceeds to Step S103, where the transmission-timing creating control unit 560 resets the line output cycle counter TCNT and increments it. At Step S104, which follows Step S103, it is determined whether the control signal "a" has a value of one. When the value is one, the process proceeds to Step S105. If the value is zero, the process proceeds to Step S107.

At Step S105, which follows after Step S104, the transmission-timing creating control unit 560 outputs the B2I_LSYNC signal. In synchronization with the B2I_LSYNC signal, signals of each of the image data, such as the B2I_RD, the B2I_GD, and the B2I_BD are output. After Step S105, the process proceeds to Step S106, where the line output counter LCNT is incremented.

After Step S106, the process proceeds to Step S107, where it is determined whether the LINE_END signal has a value indicating the end of a line. If the value indicates the end of the line, the process proceeds to Step S108, whereas if the value does not indicate the end of the line, the process of Step S107 is repeatedly performed.

At Step S108, which follows after Step S107, the value of the next control signal "a" is read out. After Step S108, the process proceeds to Step S109, where it is determined whether the value of the line output counter LCNT has the same value as that of the LOUT_END that corresponds to the number of output lines, i.e., it is determined whether the process for outputting a line, which corresponds to image data enlarged in proportion to the number of output lines, has been completed. If the values are the same, the process proceeds to Step S110, whereas if the values are not the same, the process is repeatedly performed by returning to Step S103.

At Step S110, which follows after Step S109, the B2I_FGATE that is asserted at Step S102 is negated. Accordingly, a control signal indicating the completion of the processing of a single piece of image data is created.

At Step S201 illustrated in FIG. 22, in the command control unit 550, the number-of-output lines LINE is set. Furthermore, the line output counter LCNT, which counts the number of lines of image data that has been subjected to the enlargement process, is reset. At Step S101, the line data output cycle LPERIOD, which is an output cycle for each line of the image data subjected to the enlargement process, is set.

After Step S201, the process proceeds to Step S202, where a process for reading from the buffer memory 6 is started up. Specifically, the B2I_FGATE signal is asserted.

After Step S202, the process proceeds to Step S203, where the transmission-timing creating control unit 560 resets the line output cycle counter TCNT and then increments it. At Step S204, which follows after Step S203, it is determined whether the control signal Req_Line has a value of one. If the value is one, the process proceeds to Step S205. If the value is zero, the process proceeds to Step S207.

At Step S205, which follows after Step S204, the transmission-timing creating control unit 560 outputs the B2I_LSYNC signal. In synchronization with this signal, signals of each of the image data, such as the B2I_RD, the B2I_GD, and the B2I_BD are output. After Step S205, the process proceeds to Step S206, where the line output counter LCNT is incremented.

After Step S206, the process proceeds to Step S207, where it is determined whether the LINE_END signal has a value representing the end of a line. If the value indicates the end of the line, the process proceeds to Step S208. If the value does not indicate the end of the line, the process of Step S207 is repeated.

At Step S208, which follows after Step S207, it is determined whether a value of the line output counter LCNT has the same value as that of the LOUT_END that corresponds to the number of output lines, i.e., it is determined whether the process for outputting a line, which corresponds to image data enlarged in proportion to the number of output lines, has been completed. If the values are the same, the process proceeds to Step S209, whereas if the values are not the same, the process is repeatedly performed by returning to Step S203.

At Step S209, which follows after Step S208, the B2I_FGATE that is asserted at Step S202 is negated. Accordingly, a control signal indicating the completion of the processing of a single piece of image data is created.

Figure 23:
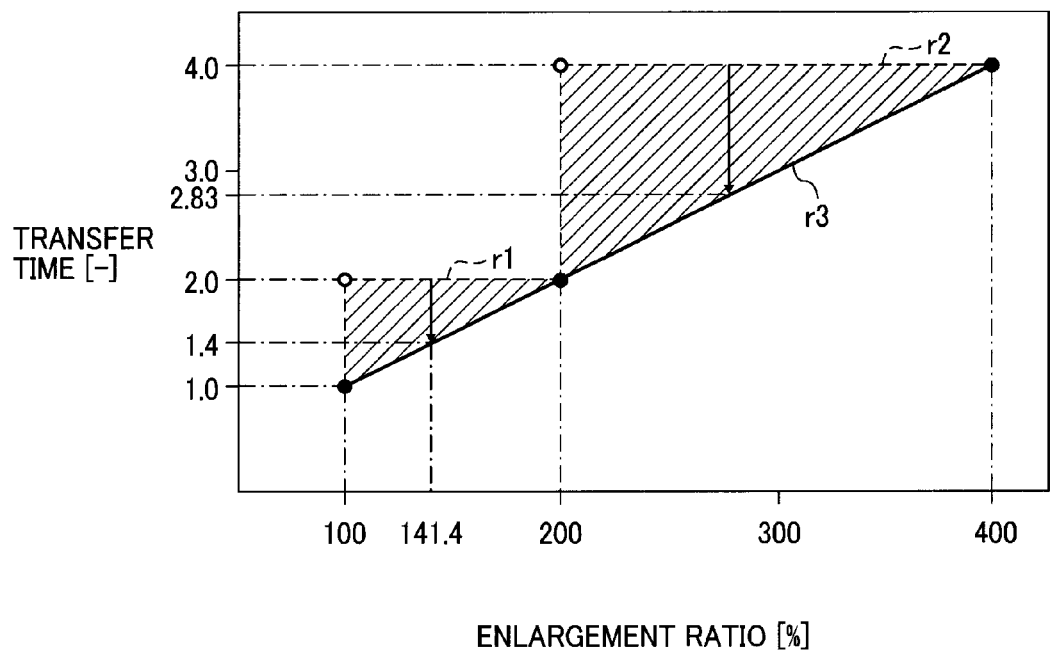
FIG. 23 is a schematic diagram illustrating an example of a transfer time that may be reduced.

FIG. 23 is a schematic diagram illustrating an example of the transfer time that may be reduced by the control device according to the present embodiment. In FIG. 23, the correlation between the enlargement ratio and the transfer time of the image data that is read from the buffer memory 6 is represented. The range r1 and the range r2 illustrated in FIG. 14 correlate with the range represented by r3 in FIG. 23; therefore, it is possible to reduce the transfer time of the diagonally shaded areas in FIG. 23.

(Realization Using a Computer and the Like)

The control device according to the present embodiment may be realized by, for example, a personal computer (PC). Furthermore, a CPU uses a main memory such as a RAM as a work area in accordance with programs stored in a ROM, a hard disk drive, or the like, thereby a control method according to the present embodiment may be implemented.

As described above, a preferred embodiment has been described; however the present invention is not limited to the present embodiment described above. Various modifications can be applied so long as they do not depart from the spirit of the present invention.

According to an aspect of the present invention, it is possible to provide a control device, an image scanning apparatus, an image forming apparatus, and a method of controlling an image scanning apparatus, in which, when image data stored in a memory is read and is subjected to an enlargement process, the time taken for outputting enlarged image data may be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device comprising:
   an image enlarging unit that creates enlarged image data of image data by repeatedly using a line in the image data; and
   a control unit that reads, from a storing unit in which the image data is stored, the image data and outputs, to the image enlarging unit, the image data for each line, the output being performed at time intervals corresponding to a number of times the line is used in accordance with an enlargement ratio of the image data to the enlarged image data, wherein
   the control unit includes a command control unit and a timing control unit,
   the command control unit outputs an enlargement ratio control signal to the timing control unit, the enlargement ratio control signal including information on the enlargement ratio,
   the timing control unit creates a control signal that controls a time interval corresponding to the number of times the line is used, based on the enlargement ratio control signal output from the command control unit,
   the control unit reads the image data from the storing unit in accordance with the control signal,
   in response to the control signal having a value of one, the timing control unit outputs a synchronization signal and the control unit outputs the image data in synchronization with the synchronization signal to the image enlarging unit,
   the timing control unit
      compares a first signal, which is output from a first counter that controls an output cycle of the line, with a second signal, which is output from a second counter that determines the output cycle for every line, and
      generates a signal indicating an end of the line, when the first signal and the second signal have a same value,
   the first counter monitors the output cycle of the line using both a received third signal and a signal from a central processing unit (CPU), and
   the second counter generates the second signal based on a first input signal, which increments an output cycle counter of a line, and a second input signal, which resets an output cycle counter of a line.

2. The control device according to claim 1, wherein the time interval is an integer multiple of a time that corresponds to a line in the enlarged image data or the image data.

3. The control device according to claim 1, further comprising an enlargement ratio setting unit that sets the enlargement ratio, wherein, in a ratio of one side length of the image of the image data to that of the enlarged image data, the enlargement ratio has a value of a power of two and a value other than a value of a power of two.

4. The control device according to claim 1, wherein the control unit includes a single semiconductor device.

5. The control device according to claim 1, wherein the timing control unit outputs the synchronization signal and the control unit outputs the image data in synchronization with the synchronization signal to the image enlarging unit only in response to the control signal having the value of one.

6. The control device according to claim 1, wherein
   the control unit further includes a memory read control unit that reads the image data from the storing unit in accordance with the control signal, and
   the timing control unit outputs the control signal to the memory read control unit, without outputting the control signal to the command control unit.

7. The control device according to claim 1, wherein
   the first counter sets an output cycle for each line of the image data before the control unit reads the image data from the storing unit, and
   the image enlarging unit outputs the image data to an image memory access control unit, the output cycle being constant for each line of the image data that is output to the image memory access control unit.

8. The control device according to claim 1, further comprising an enlargement ratio setting unit that sets the enlargement ratio to 141%.

9. The control device according to claim 1, further comprising:
an enlargement ratio setting unit that sets the enlargement ratio to 141%, wherein
the first counter sets an output cycle for each line of the image data before the control unit reads the image data from the storing unit, and
the image enlarging unit outputs the image data to an image memory access control unit, the output cycle being constant for each line of the image data that is output to the image memory access control unit.

10. An image scanning apparatus comprising:
a storing unit that stores image data created by optically reading an image formed on a manuscript;
an image enlarging unit that creates enlarged image data of the image data by repeatedly using a line in the image data; and
a control unit that reads, from the storing unit, the image data and outputs, to the image enlarging unit, the image data for each line, the output being performed at time intervals corresponding to a number of times the line is used in accordance with an enlargement ratio of the image data to the enlarged image data, wherein
the control unit includes a command control unit and a timing control unit,
the command control unit outputs an enlargement ratio control signal to the timing control unit, the enlargement ratio control signal including information on the enlargement ratio,
the timing control unit creates a control signal that controls a time interval corresponding to the number of times the line is used, based on the enlargement ratio control signal output from the command control unit,
the control unit reads the image data from the storing unit in accordance with the control signal,
in response to the control signal having a value of one, the timing control unit outputs a synchronization signal and the control unit outputs the image data in synchronization with the synchronization signal to the image enlarging unit,
the timing control unit
compares a first signal, which is output from a first counter that controls an output cycle of the line, with a second signal, which is output from a second counter that determines the output cycle for every line, and
generates a signal indicating an end of the line, when the first signal and the second signal have a same value,
the first counter monitors the output cycle of the line using both a received third signal and a signal from a central processing unit (CPU), and
the second counter generates the second signal based on a first input signal, which increments an output cycle counter of a line, and a second input signal, which resets an output cycle counter of a line.

11. A method of controlling an image scanning apparatus comprising:
storing, in a storing unit, image data created by optically reading an image formed on a manuscript;
enlarging, by an image enlarging unit, the image of the image data by repeatedly using a line in the image data;
reading, by a control unit, the image data from the storing unit and outputting, by the control unit to the image enlarging unit, the image data for each line, the outputting being performed at time intervals corresponding to a number of times the line is used in accordance with an enlargement ratio of the image data to the enlarged image data;
outputting, by a command control unit included in the control unit, an enlargement ratio control signal to a timing control unit included in the control unit, the enlargement ratio control signal including information on the enlargement ratio;
creating, by the timing control unit, a control signal that controls a time interval corresponding to the number of times the line is used, based on the enlargement ratio control signal output by the command control unit, wherein
the reading of the image data from the storing unit is performed in accordance with the control signal,
in response to the control signal having a value of one, outputting, by the timing control unit, a synchronization signal, and
in response to the control signal having the value of one, the outputting, by the control unit, outputs the image data in synchronization with the synchronization signal to the image enlarging unit;
comparing, by the timing control unit, a first signal, which is output from a first counter that controls an output cycle of the line, with a second signal, which is output from a second counter that determines the output cycle for every line;
generating, by the timing control unit, a signal indicating an end of the line, when the first signal and the second signal have a same value;
monitoring, by the first counter, the output cycle of the line using both a received third signal and a signal from a central processing unit (CPU); and
generating, by the second counter, the second signal based on a first input signal, which increments an output cycle counter of a line, and a second input signal, which resets an output cycle counter of a line.

12. The method of controlling the image scanning apparatus according to claim 11, wherein the time interval is an integer multiple of a time that corresponds to a line in the enlarged image data or the image data.

13. The method of controlling the image scanning apparatus according to claim 11, further comprising setting the enlargement ratio, wherein, in a ratio of one side length of the image of the image data to that of the enlarged image data, the enlargement ratio has a value of a power of two and a value other than a value of a power of two.

* * * * *